(12) United States Patent
Janiga

(10) Patent No.: US 11,610,191 B1
(45) Date of Patent: *Mar. 21, 2023

(54) CASH TRANSACTION MACHINE

(71) Applicant: Block, Inc., San Francisco, CA (US)

(72) Inventor: Matthew W. Janiga, South San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,379

(22) Filed: Jun. 3, 2019

Related U.S. Application Data

(63) Continuation of application No. 14/662,144, filed on Mar. 18, 2015, now Pat. No. 10,354,246.

(51) Int. Cl.
G06Q 20/32 (2012.01)
G06Q 20/20 (2012.01)
G06Q 20/40 (2012.01)
G06Q 20/10 (2012.01)

(52) U.S. Cl.
CPC ..... G06Q 20/3224 (2013.01); G06Q 20/1085 (2013.01); G06Q 20/20 (2013.01); G06Q 20/3223 (2013.01); G06Q 20/3274 (2013.01); G06Q 20/401 (2013.01)

(58) Field of Classification Search
CPC .......... G06Q 20/1085; G06Q 20/20; G06Q 20/3223; G06Q 20/401; G06Q 20/3221; G06Q 20/3224
See application file for complete search history.

(56) References Cited

U.S. PATENT DOCUMENTS

| 5,629,981 A | 5/1997 | Nerlikar | |
| 5,992,570 A * | 11/1999 | Walter | A47F 9/048 186/36 |
| 6,473,500 B1 * | 10/2002 | Risafi | G07F 7/1008 235/379 |

(Continued)

OTHER PUBLICATIONS

W. Chen, G. P. Hancke, K. E. Mayes, Y. Lien and J. . -H. Chiu, "NFC Mobile Transactions and Authentication Based on GSM Network," 2010 Second International Workshop on Near Field Communication, 2010, pp. 83-89, (Year: 2010).*

(Continued)

*Primary Examiner* — Asfand M Sheikh
(74) *Attorney, Agent, or Firm* — Baker Botts L.L.P.

(57) ABSTRACT

Introduced is a technology for withdrawing cash from a cash transaction machine (CTM) by use of a mobile payment application installed on a mobile device of a consumer user ("the CTM technology"). Briefly described, the CTM technology enables a consumer user to identify one or more CTMs from which to withdraw cash by using his/her mobile device (e.g., a smartphone) as a "virtual" card. A particular CTM can be a conventional ATM or a POS system at a merchant's place of business. The user can use a mobile payment application installed on the user's mobile device to identify any nearby CTMs, request a withdrawal amount from a particular CTM from the identified nearby CTMs, receive a transaction code specific to that particular CTM, and physically obtain, or collect, the cash representative of the withdrawal amount at that particular CTM using the transaction code.

20 Claims, 8 Drawing Sheets

(56) References Cited

U.S. PATENT DOCUMENTS

| | | | |
|---|---|---|---|
| 7,096,003 B2* | 8/2006 | Joao | G06Q 20/3227 |
| | | | 455/414.1 |
| 7,711,620 B2 | 5/2010 | Abifaker | |
| 7,953,654 B2 | 5/2011 | Abifaker | |
| 8,065,226 B2 | 11/2011 | Rizzo et al. | |
| 8,160,943 B2 | 4/2012 | Smith et al. | |
| 8,175,972 B2 | 5/2012 | Galit et al. | |
| 8,220,706 B1 | 7/2012 | Miller et al. | |
| 8,326,770 B1 | 12/2012 | Weisman | |
| 8,407,121 B2 | 3/2013 | Paintin | |
| 8,412,630 B2 | 4/2013 | Ross et al. | |
| 8,494,960 B2 | 7/2013 | Galit et al. | |
| 8,538,845 B2 | 9/2013 | Liberty | |
| 8,538,879 B2 | 9/2013 | Galit et al. | |
| 8,548,334 B2 | 10/2013 | Mazed | |
| 8,560,436 B2 | 10/2013 | Ingram et al. | |
| 8,566,203 B1 | 10/2013 | Vieira et al. | |
| 8,632,000 B2* | 1/2014 | Laracey | G06F 21/36 |
| | | | 235/379 |
| 8,694,401 B2 | 4/2014 | Stewart | |
| 9,047,600 B2 | 6/2015 | Zhou et al. | |
| 9,135,612 B1 | 9/2015 | Proctor, Jr. et al. | |
| 9,202,250 B1 | 12/2015 | Palaniappan | |
| 9,300,676 B2 | 3/2016 | Madhu et al. | |
| 9,519,901 B1 | 12/2016 | Dorogusker | |
| 9,552,573 B2 | 1/2017 | Kulpati et al. | |
| 9,626,664 B2 | 4/2017 | Bouey et al. | |
| 9,647,998 B2* | 5/2017 | Ronca | H04L 63/0876 |
| 9,665,858 B1 | 5/2017 | Kumar | |
| 9,743,261 B2 | 8/2017 | Todasco | |
| 9,767,503 B2 | 9/2017 | Grigg et al. | |
| 9,786,005 B1 | 10/2017 | Poursartip et al. | |
| 9,836,727 B1* | 12/2017 | Brennan | G06Q 20/20 |
| 9,875,471 B1 | 1/2018 | Myrick et al. | |
| 9,911,114 B2 | 3/2018 | Rackley, III et al. | |
| 9,961,076 B2 | 5/2018 | Stoops et al. | |
| 9,978,068 B2 | 5/2018 | Butterfield et al. | |
| 9,984,412 B1 | 5/2018 | Poursartip et al. | |
| 10,026,076 B2 | 7/2018 | Kumar et al. | |
| 10,027,684 B1 | 7/2018 | Paterson et al. | |
| 10,043,162 B1 | 8/2018 | Renke et al. | |
| 10,108,940 B2 | 10/2018 | Kosloski et al. | |
| 10,163,171 B1 | 12/2018 | Vippagunta et al. | |
| 10,217,093 B2 | 2/2019 | Trivedi et al. | |
| 10,223,707 B2 | 3/2019 | Granville, III | |
| 10,354,246 B1 | 7/2019 | Janiga | |
| 10,373,281 B2 | 8/2019 | Lutnick et al. | |
| 10,510,066 B2* | 12/2019 | Lovett | G07F 19/00 |
| 11,308,481 B1* | 4/2022 | Thomas | G06Q 20/4012 |
| 2002/0049644 A1* | 4/2002 | Kargman | G06Q 20/4014 |
| | | | 705/26.1 |
| 2002/0170959 A1* | 11/2002 | Madani | G06Q 20/04 |
| | | | 235/380 |
| 2003/0144956 A1* | 7/2003 | Yu, Jr. | G06Q 20/108 |
| | | | 705/42 |
| 2003/0216960 A1 | 11/2003 | Postrel | |
| 2003/0233278 A1 | 12/2003 | Marshall | |
| 2004/0068552 A1 | 4/2004 | Kotz et al. | |
| 2004/0267667 A1 | 12/2004 | Ohara | |
| 2005/0177537 A1* | 8/2005 | Thompson | G06F 9/546 |
| 2006/0025159 A1 | 2/2006 | Estevez et al. | |
| 2006/0206709 A1 | 9/2006 | Labrou et al. | |
| 2007/0005467 A1* | 1/2007 | Haigh | G06Q 40/00 |
| | | | 705/35 |
| 2007/0092112 A1 | 4/2007 | Awatsu et al. | |
| 2009/0024506 A1 | 1/2009 | Houri | |
| 2010/0114677 A1 | 5/2010 | Carlson et al. | |
| 2011/0016047 A1 | 1/2011 | Wu et al. | |
| 2011/0238573 A1 | 9/2011 | Varadarajan | |
| 2011/0251956 A1 | 10/2011 | Cantley et al. | |
| 2012/0173311 A1* | 7/2012 | Chang | G06Q 30/0241 |
| | | | 705/14.1 |
| 2012/0239570 A1 | 9/2012 | Wolfs et al. | |
| 2013/0031009 A1 | 1/2013 | Kapoor et al. | |
| 2013/0046589 A1 | 2/2013 | Grigg et al. | |
| 2013/0046697 A1 | 2/2013 | Schibuk | |
| 2013/0054369 A1 | 2/2013 | Grigg et al. | |
| 2013/0085931 A1 | 4/2013 | Runyan | |
| 2013/0124411 A1 | 5/2013 | Kobres et al. | |
| 2013/0178233 A1 | 7/2013 | McCoy et al. | |
| 2013/0191232 A1 | 7/2013 | Calman et al. | |
| 2013/0232064 A1 | 9/2013 | Bosch | |
| 2013/0238497 A1* | 9/2013 | Ramachandran | G06Q 20/40 |
| | | | 705/41 |
| 2013/0262303 A1 | 10/2013 | Metral | |
| 2013/0290172 A1 | 10/2013 | Mashinsky | |
| 2014/0156435 A1 | 6/2014 | Rahman et al. | |
| 2014/0156512 A1 | 6/2014 | Rahman et al. | |
| 2014/0195427 A1 | 7/2014 | Reeve et al. | |
| 2014/0195436 A1 | 7/2014 | Schleicher | |
| 2014/0235205 A1* | 8/2014 | Paluch | H04W 12/06 |
| | | | 455/411 |
| 2014/0279490 A1 | 9/2014 | Caiman et al. | |
| 2014/0335787 A1* | 11/2014 | Smadi | H04L 67/06 |
| | | | 455/41.2 |
| 2014/0337138 A1* | 11/2014 | Chitalia | G06K 19/06028 |
| | | | 705/16 |
| 2015/0001289 A1* | 1/2015 | Smith | G06Q 20/3278 |
| | | | 235/379 |
| 2015/0235190 A1* | 8/2015 | Urban | G07F 7/1041 |
| | | | 705/72 |
| 2015/0254655 A1* | 9/2015 | Bondesen | G06Q 20/1085 |
| | | | 705/72 |
| 2015/0302411 A1 | 10/2015 | Bondesen et al. | |
| 2015/0310470 A1 | 10/2015 | Mathew et al. | |
| 2015/0339638 A1 | 11/2015 | Deluca | |
| 2016/0078417 A1* | 3/2016 | Deluca | G07F 9/001 |
| | | | 705/43 |
| 2016/0104140 A1 | 4/2016 | Harrow et al. | |
| 2016/0140521 A1 | 5/2016 | Trivedi et al. | |
| 2017/0004503 A1* | 1/2017 | Yalamanchili | G06Q 20/405 |
| 2017/0124542 A1 | 5/2017 | Sharan | |
| 2017/0124551 A1* | 5/2017 | Chitalia | G06Q 20/202 |
| 2018/0005223 A1 | 1/2018 | Terra et al. | |
| 2018/0096323 A1* | 4/2018 | Baber | G06Q 20/4012 |
| 2018/0096351 A1 | 4/2018 | Dahn | |
| 2018/0204204 A1 | 7/2018 | Giraudo et al. | |
| 2021/0304571 A1* | 9/2021 | Sanghvi | G08B 15/00 |

OTHER PUBLICATIONS

Non-Final Office Action dated Nov. 22, 2019, for U.S. Appl. No. 15/283,019, of Dahn, Michael, filed Sep. 30, 2016.
Buczkowski, A., "Location-based marketing," The Academic Framework, pp. 1-77 (Feb. 2012).
Wikipedia, "Payday Loan", Sep. 20, 2016, https://en.wikipedia.org/w/index.php?title=Payday_loan&oldid=740410133, pp. 1-15, (Year: 2016).
Wolfe, D., "An E-Variation on Payday Loan Theme", American Banker, Published Jul. 28, 2005, 1:00am EDT, https://www.americanbanker.com/news/an-e-variation-on-payday-loan-theme, pp. 1-3, (Year: 2005).
Non-Final Office Action dated Sep. 21, 2017, for U.S. Appl. No. 14/662,144, of Janiga, M.W., filed Mar. 18, 2015.
Final Office Action dated Apr. 27, 2018, for U.S. Appl. No. 14/662,144, of Janiga, M.W., filed Mar. 18, 2015.
Non-Final Office Action dated Aug. 10, 2018, for U.S. Appl. No. 14/662,144, of Janiga, M.W., filed Mar. 18, 2015.
Non-Final Office Action dated Nov. 27, 2018 for U.S. Appl. No. 15/283,019, of Dahn, M., filed Sep. 30, 2016.
Notice of Allowance dated Feb. 25, 2019, for U.S. Appl. No. 14/662,144, of Janiga, M.W., filed Mar. 18, 2015.
Final Office Action dated Apr. 15, 2019, for U.S. Appl. No. 15/283,019, of Dahn, M., filed Sep. 30, 2016.
Advisory action dated Jun. 26, 2019, for U.S. Appl. No. 15/283,019, of Dahn, M., filed Sep. 30, 2016.
Final Office Action dated May 14, 2020, for U.S. Appl. No. 15/283,019, of Dahn, Michael, filed Sep. 30, 2016.

(56) References Cited

OTHER PUBLICATIONS

Advisory Action dated Aug. 26, 2020, for U.S. Appl. No. 15/283,019, of Dahn, M., filed Sep. 30, 2016.
Non-Final Office Action dated Jan. 26, 2021, for U.S. Appl. No. 15/283,019, of Dahn, Michael, filed Sep. 30, 2016.
Final Office Action dated Aug. 12, 2021, for U.S. Appl. No. 15/283,019, of Dahn, Michael, filed Sep. 30, 2016.
Non-Final Office Action dated Mar. 29, 2022, for U.S. Appl. No. 15/283,019, of Dahn, Michael, filed Sep. 30, 2016.
Notice of Allowance dated Aug. 15, 2022, for U.S. Appl. No. 15/283,019, of Dahn, Michael, filed Sep. 30, 2016.
Advisory Action dated Oct. 21, 2021, for U.S. Appl. No. 15/283,019, of Dahn, Michael, filed Sep. 30, 2016.

\* cited by examiner

Welcome, Alex!

Check Account Balance

View Linked Accounts

Withdraw Cash

Sign Out

*FIG. 7A*

Enter Amount

$20.00|

Withdraw    X

*FIG. 7B*

Locations

<u>Name</u>                         <u>Distance</u>
1. Bernice Café               1 mi.
   321 Sesame St.

2. Bank X ATM              1.1 mi.
   123 Easy St.

3. Bank Y ATM              5 mi.
   999 Bernie St.

4. Greg's Electronics     5.2 mi.
   123 Mash St.

5. Dee's Dry Cleaners   8.5 mi.
   123 Mash St.

CASH TRANSACTION MACHINE

PRIORITY

This application is a continuation under 35 U.S.C. § 120 of U.S. patent application Ser. No. 14/662,144, filed 18 Mar. 2015, which is incorporated herein by reference.

BACKGROUND

Although some mechanisms, such as credit cards and debit cards, are acceptable payment forms, cash is still sometimes a necessary form of payment in everyday life. For example, some merchants operating small businesses may not yet have the infrastructure (e.g., equipment and relationships with credit card processing institutions) for accepting credit cards due to the perceived associated costs (e.g., transaction fees, system setup, etc.) and/or the required resources (e.g., network access for electronic payment processing). Furthermore, some transactions involving small payment amounts (e.g., tipping, food truck transactions, or "IOU's" between friends) may be better facilitated with cash in the absence of alternatives. Moreover, some individuals, and even some merchants, may simply prefer to conduct transactions with cash rather than credit or debit cards.

Conventional solutions exist to alleviate the problem, but they often come with a considerable amount of restrictions. One solution, for example, is an automated teller machine (ATM). The ATM, however, often charges a transaction fee with every cash withdrawal if the user is not an account holder at the financial institution associated with the ATM. Furthermore, ATMs commonly require insertion of a physical card issued by a financial institution in order to dispense the cash, thereby requiring the individual to carry around that card, which may inconveniently contribute to a bulky wallet. Another existing solution is "cashback" in purchases. However, cashback often requires the individual to actually make a purchase at a merchant's place of business in order to obtain the cash.

BRIEF DESCRIPTION OF THE DRAWINGS

The technology introduced here may be better understood by referring to the following Detailed Description in conjunction with the accompanying drawings, in which like reference numerals indicate identical or functionally similar elements.

FIGS. 7A-7C are user interface diagrams illustrating various example screen displays that can be generated by a user's processing device to enable the CTM technology.

DETAILED DESCRIPTION

Figure 1:
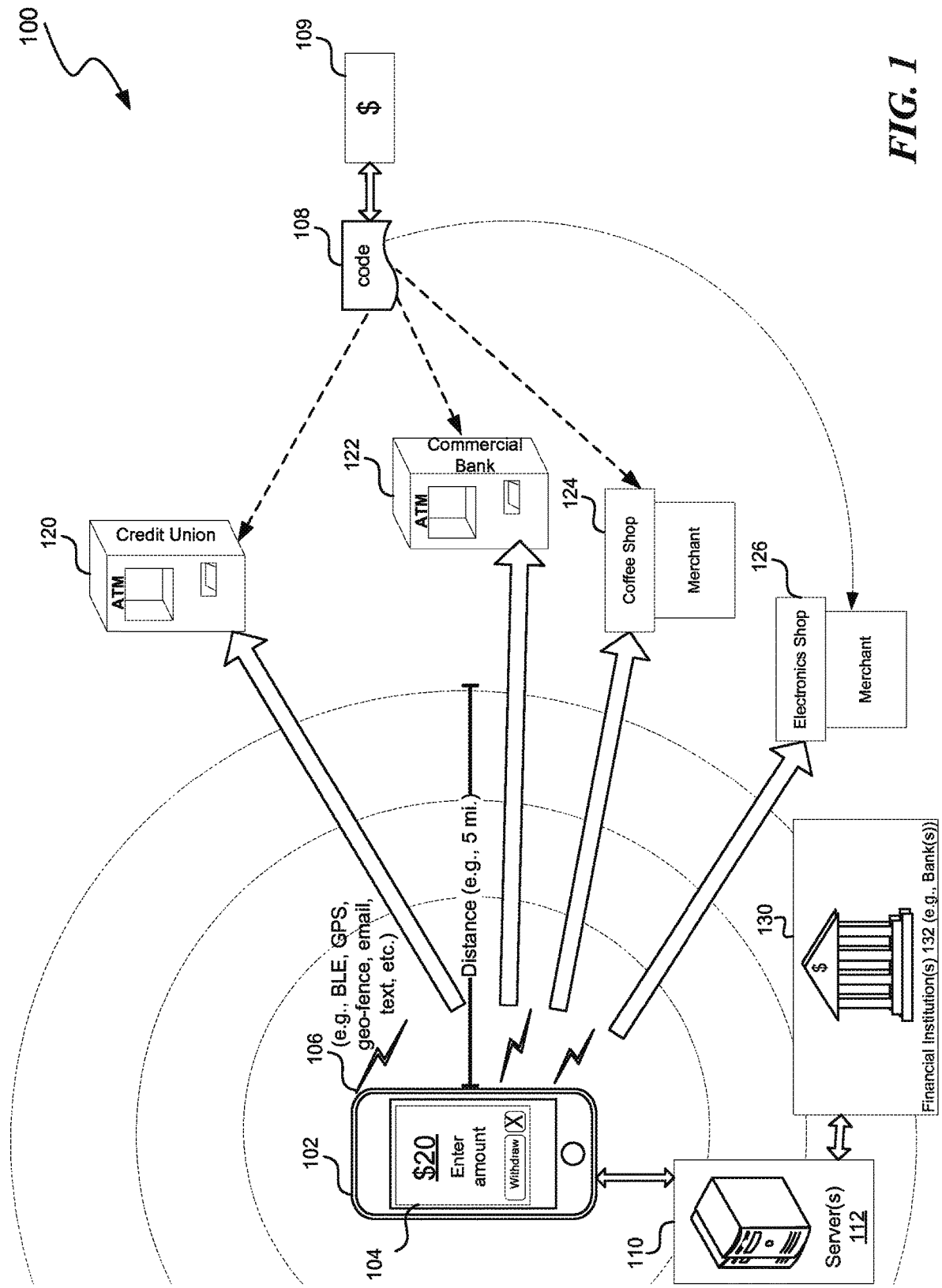
FIG. 1 is a data flow diagram illustrating an overview of a process for withdrawing cash by use of a Cash Transaction Machine (CTM) technology.

A cash transaction machine (CTM) technology is disclosed herein. The CTM enables users to withdraw cash by using a mobile payment application installed on a mobile computing device ("mobile device") of a consumer user ("the CTM technology"). As used here, the term "cash transaction machine" (or CTM) refers to a computer system comprising of one or more hardware and software components that are capable of causing cash to be dispensed at a physical location (e.g., for use by the consumer user). A CTM can include, for example, a computer system of an Automated Teller Machine (ATM) associated with a financial institution (e.g., a commercial bank), or a point-of-sale (POS) system or terminal associated with a merchant (e.g., a coffee shop). The term "POS system" or "POS terminal" as used here refers to any computer system running sales applications, which can include a mobile device running sales application, cloud-based POS system, checkout register, computer system running an Internet-based application such as a web browser, and the like.

Briefly described, the CTM technology enables a user (e.g., a consumer) to identify one or more CTMs from which to withdraw cash by using his/her mobile device (e.g., a smartphone) as a "virtual" card, but without requiring "swiping". In particular, the CTMs can be a conventional ATM or a POS system at a merchant's place of business. The user can use a mobile payment application installed on the user's mobile device to identify any nearby CTMs, request a withdrawal amount from a particular CTM from the identified nearby CTMs, receive a transaction code specific to that particular CTM, and physically obtain, or collect, the cash representative of the withdrawal amount at that particular CTM using the transaction code. In various embodiments, the mobile device may use proximity-based communications (e.g., Bluetooth® or other near-field communications) to identify the user and/or validate the transaction in addition to or instead of the transaction code.

Among other benefits, the CTM technology relieves the user of the burden of having to carry around a physical card (e.g., a conventional debit card), as the user can obtain cash so long as the user has his/her mobile device. Furthermore, since the user is able to withdraw cash from any type of CTM (e.g., a conventional ATM associated with any financial institution or any merchant's POS system), the CTM technology removes the restrictions that are generally associated with conventional cash withdrawals. These restrictions can include, for example, limited availability of ATMs, ATM transaction fees for unaffiliated bank members, purchase requirement for cashback, a set amount denomination (e.g., withdrawal amount restricted to multiples of $20), etc., all of which are inconveniences addressed by the CTM technology.

Consider the following example scenario in which a user needs to withdraw cash. The user launches a mobile payment application installed on her mobile device, such as a smartphone, to request a cash withdrawal of $20. The mobile payment application is in communication with a remote payment service system (PSS) that is employed by a third-party payment service provider (or simply, "payment service"). As used herein, the term "user" refers to a consumer or a customer being serviced by the payment service employing the PSS. In accordance with some embodiments, the PSS facilitates the CTM technology to enable users, through the mobile payment application, to withdraw cash at a number of physical locations, including ATMs associated with conventional financial institutions and POS systems/terminals associated with merchants (or sellers).

Using the mobile payment application, the user can request cash by specifying a withdrawal amount (e.g., $20) that she wishes to obtain. In response to the request, the mobile payment application transmits onto a network a request message to the PSS. The request message can include the withdrawal amount along with other information associated with the user's request. The other information can include, for example, user information (e.g., login credentials of the user or biometric information of the user) and geographical information associated with a location of the user (e.g., GPS coordinates derived from the mobile device's sensor(s)).

When the PSS receives the request message, the PSS identifies a financial account that is associated with the user account, where funds in that financial account can be withdrawn for processing the cash withdrawal. In some embodiments, the PSS identifies the financial account associated with the user at a later time (e.g., after the user has selected a CTM from which to withdraw cash or after the user has collected the cash from the CTM). In such embodiments, the CTM dispenses the cash and is reimbursed by the PSS for the withdrawal amount.

Referring back to the example scenario, the PSS next identifies for the user a list of one or more CTMs that are physically located nearby the user. The PSS identifies the list of CTMs based on the geographical information included in the request message. In some embodiments, the PSS identifies the list of CTMs based on transaction fees charged by the CTMs. In some embodiments, the PSS can sort the list of CTMs based on geographical information or transaction fees. In some embodiments, the PSS identifies the list of CTMs based on available cash balances of the CTMs. In some embodiments, the PSS identifies the list of CTMs based on the maximum withdrawal limits of the CTMs. For example, the list of CTMs identified does not include any CTM with no available cash for withdrawal or any CTM that has a maximum withdrawal amount lower than the consumer user's desired withdrawal amount.

In some embodiments, the PSS can track cash balances at the CTMs (e.g., "ATM-based CTMs" and "merchant-based CTMs") to identify the list of CTMs based on the available cash balances, by implementing a tracking tool. In some embodiments, the PSS includes a tracking tool that periodically sends a cash balance request message to one or more ATM-based CTMs request a report of a current cash balance at the one or more ATM-based CTMs. In some embodiments, the PSS provides the tracking tool in the form of an application installed at the ATM.

In some embodiments, the PSS provides the tracking tool in the form of an application installed at a merchant POS system (e.g., a cash balance reporting application). A merchant, for example, can input, or submit, the cash balance into the tracking tool at the beginning of the day when he/she conducts business. Periodically through that day, the merchant can input cash amounts tendered into the tracking tool. The tracking tool can perform computations using the beginning cash-balance and these periodic cash tender amounts (e.g., subtraction), thereby enabling the tracking tool to accurately track the cash balance throughout the business day. The tracking tool is coupled in communication with the PSS, and updates the PSS of the cash balance available at the merchant-based CTM. For example, the PSS can send a cash balance request to the tracking tool. The request can be sent periodically or in response to a cash request received from a consumer user (to assist the PSS in identifying an available CTM with for the consumer user).

The PSS then transmits onto the network a reply message to the mobile payment application, which is triggered to display the list of CTMs to the user. In some embodiments, the mobile payment application itself identifies the list of CTMs and displays for the user. The list of CTMs can include, for example, a nearby coffee shop, a nearby bookstore, a nearby ATM associated with a credit union, and/or a nearby ATM associated with a commercial bank. The user can select a particular CTM from the list of CTMs to specify the CTM from which she desires to withdraw the cash.

In some embodiments, upon receiving the user's CTM selection, the mobile payment application transmits onto the network a message that includes the selection to the PSS. Upon receiving the user's selection from the mobile payment application, the PSS generates a transaction code corresponding to the selected CTM, and transmits, onto the network to the mobile payment application, a message that includes the code for displaying to the user. The mobile payment application, for example, displays for the user the code and information about the selected CTM corresponding to the code (e.g., address of the CTM, walking directions to the selected CTM, etc.).

In some embodiments, upon receiving the user's selection, the PSS forwards information about the user to the selected CTM, which then generates the transaction code and returns it to the PSS. The PSS then transmits the transaction code to the mobile device for display to the user via a graphical user interface of the mobile payment application.

The user can then withdraw cash at the selected CTM by using the generated transaction code. For example, the user can walk to a nearby ATM associated with a credit union, and enter the code at the ATM to obtain the cash. In another example, the user walks into a coffee shop and provides the code to a sales clerk for entering into a POS terminal to obtain the cash, where the user is not restricted by the conventional requirement to make a purchase at the coffee shop.

In some embodiments, the transaction code corresponding to the selected CTM is configured to expire after a specified time period (e.g., 30 seconds, 2 minutes, 10 minutes, etc.). In such embodiments, the user must use the code at the selected CTM before expiration of the specified time period. Upon expiration, the user could, for example, request a new code and/or submit a new cash withdrawal request. In some embodiments, the transaction code is configured to expire based on a location of the user (i.e., as determined using the user's mobile device) relative to the location of the selected CTM. For example, if the CTM selected is located within 1 mile of the user, the code is configured to expire after a time period that requires the user to walk to the CTM. For example, if the CTM selected is located within 1 mile of the user, the code is configured to expire after 20 minutes, which is a time period that can be specified based on an average human walking speed.

In some embodiments, the transaction code is configured to expire based on a geofence. For example, if the user is half a mile from the selected CTM, the code generated for the user is configured to expire if the user exits a larger ¾ mile geofence surrounding the selected CTM. In some embodiments, a transaction code can be configured to have both geofence-based expiration and time-based expiration characteristics.

In some embodiments, the PSS transmits, to the selected CTM, biometric information associated with the user. The selected CTM can use the biometric information (along with the code) to verify the user when she attempts to obtain the withdrawal amount at the selected CTM. For example, the user provides the code along with her fingerprint at the selected CTM to obtain the cash. In some embodiments, where the selected CTM generates the code, the selected CTM can utilize the biometric information in the code generation. For example, the code can be encrypted data that include the biometric information.

After the user has obtained, or withdrawn, the cash from the selected CTM, the PSS executes, or initiates, a funds transfer between the financial account associated with the user and a financial account associated with the selected CTM. The funds transfer can include the withdrawal amount and a transaction fee amount associated with the withdrawal request. For example, the funds transfer includes funds for the original $50 requested amount and a $1.00 fee amount (e.g., 2% transaction fee). In some embodiments, the PSS initiates the funds transfer prior to the cash withdrawal. In some embodiments, the PSS initiates the funds transfer concurrent to the user's cash withdrawal. Further details regarding the funds transfer will be discussed below.

Note that in the embodiments emphasized here, although the user uses a mobile device to request the cash withdrawal, in other embodiments the user may use a processing device other than a mobile device to make that request, such as a conventional personal computer (PC). In such embodiments, the mobile payment application can be replaced by a conventional software application executing in such a processing device, where such software application has functionality similar to that of the mobile payment application as described herein. For example, the user, sitting at home, can launch the conventional software application installed on her desktop computer to request for cash withdrawal from a CTM located near her home.

The terminology used below is to be interpreted in its broadest reasonable manner, even though it is being used in conjunction with a detailed description of certain specific examples of the embodiments. Indeed, some terms may even be emphasized below; however, any terminology intended to be interpreted in any restricted manner will be overtly and specifically defined as such in this section.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Further, in this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to are also not necessarily mutually exclusive.

Various examples of the CTM technology will now be described in further detail with reference to the accompanying figures. The following description provides specific details for a thorough understanding and enabling description of these examples. One skilled in the relevant art will understand, however, that the CTM technology discussed herein may be practiced without many of these details. Likewise, one skilled in the relevant art will also understand that the CTM technology can include many other obvious features not described in detail herein. Additionally, some well-known structures or functions may not be shown or described in detail below, so as to avoid unnecessarily obscuring the relevant description.

Turning now to the figures, FIG. 1 is a data flow diagram illustrating an overview of a process 100 for withdrawing cash by use of the CTM technology, in accordance with various embodiments. As illustrated, the process 100 involves communication between a mobile device 102 belonging to a consumer user, a payment service system 110 ("PSS 110"), and one or more CTMs 120, 122, 124, and 126. In some embodiments, the process 100 also involves a financial system 130.

The PSS 110 includes one or more server computers 112 that are employed by a third-party payment service provider, or payment service. The payment service employs the PSS 110 to execute one or more applications (e.g., an application 104) that enable consumers to carry out various financial services. One example financial service offers a consumer the ability to withdraw cash from any business entity, including ATMs and/or POS systems of merchants without the restrictions of conventional cash withdrawal methodologies.

Before the process 100 can start, a mobile payment application 104 is installed on the consumer user's mobile device 102 (e.g., through an online application store, manufacturer pre-installation, or a web portal), and a cash withdrawal application (not shown) (e.g., the application 502 of FIG. 5) is installed on the one or more CTMs 120, 122, 124, 126. The mobile payment application 104 and the cash withdrawal application are configured to communicate with the PSS 110 to facilitate and/or process the cash withdrawal requests from the consumer user.

In some embodiments, the consumer user is also required to create a user account with the PSS 110. For example, the consumer user enters a name, account password, and contact information, e.g., email address. The consumer user can do so from the mobile device 102 by using the mobile payment application 104, or a mobile web browser, or by using another processing device such as a home computer with a conventional web browser. In some embodiments, before the process 100 can be performed, the consumer user also enters financial account information sufficient to conduct the cash withdrawal transaction according to the CTM technology ("CTM transaction"), where the financial account information is submitted to and/or stored by the PSS 110. For example, in the case of a debit card account, the consumer user can enter the card issuer, the card number, the expiration date and the CVV into the mobile payment application 104, which forwards that information to the PSS 110; the mailing address may also be required. Alternatively, a financial account could also be associated with a credit card, a pre-paid card, or another third party financial account.

In some embodiments, the PSS 110 requires that the consumer user provide additional personal identifying information before a CTM transaction will be allowed, such as biometric information relating to the consumer user (e.g., a photo of the consumer user, a fingerprint, a voice sample, an iris scan, etc.) The biometric information would later be provided to a particular CTM (e.g., via the application 502) so that this particular CTM can compare the biometric information to a biometric identifier (e.g., via fingerprint scanner, retina scanner, facial recognition scan, etc.) provided by the consumer user physically at the CTM's location. In some embodiments, the particular CTM can require a code be entered by the consumer user. Other requirements can also be added to increase security. The data associated with the consumer user's account can be stored in a database (not shown) at the PSS 110 (e.g., at the servers 112).

In operation, the consumer user carries the mobile device 102 with the mobile payment application 104 installed, and launches the mobile payment application 104 to request for cash withdrawal at a particular CTM (e.g., a nearby CTM or a CTM at a specific location). In some embodiments, the mobile payment application 104 prompts the consumer to submit login credentials to authenticate the user with the PSS 110 before allowing access to request the cash withdrawal. The login credentials can be a username and a password. In some embodiments, the consumer is prompted to submit biometric information in addition to the username and password for authentication.

Upon receiving the cash withdrawal request from the consumer user, the mobile payment application 104 determines a list of CTM's by using sensor information 106 sensed by one or more sensors (not shown) of the mobile device 102 (e.g., nearby CTMs as determined by the mobile device's current location). The one or more sensors can include, for example, a BLE sensor, a GPS sensor, a proximity sensor, and/or the like. The sensor information sensed by the sensor(s) can include, for example, location information, where the sensor information 106 helps determine a current location of the consumer.

Using the current location included in the sensor information, the mobile payment application 104 can identify one or more CTMs that are nearby for the consumer to obtain cash. In some embodiments, the mobile payment application 104 sends the sensor information 106 to the PSS 110, which determines the list of CTM's that are nearby and sends it back to the mobile payment application 104 installed on the mobile device 102. As used here, the term "nearby," "near," or variations thereof refer to physical location (of a CTM) within a specified distance of the consumer (as determined based on the mobile device 102). In some embodiments, the specified distance is configured by an administrator of the PSS 110 and/or the mobile payment application 104. For example, the administrator can predetermine the distance to be set at a default of 5 miles, where all CTMs located within 5 miles from the mobile device 102 are identified for the consumer upon the consumer's request. In some embodiments the specified distance is configured by the consumer. For example, the consumer can specify to view only CTMs that are located within 1 mile of the consumer, 100 yards of the consumer, or 1 city block of the consumer.

In some embodiments, the mobile payment application 104 identifies only those CTM's that are available for cash withdrawal at the time that the consumer submits the request for cash withdrawal. For example, a "bakery" merchant, which may ordinarily be a CTM, is temporarily unavailable, and as such, that bakery does not appear on the list of CTM's to the consumer.

In some embodiments, the consumer may wish to request cash withdrawal at a CTM that is located in a vicinity that is not necessarily "near" her current location. In such embodiments, the mobile payment application 104 enables the consumer user to search for CTM's that are physically located within a particular area the consumer user desires. For example, the mobile payment application 104 enables the consumer user to input a ZIP Code, an address, and/or a point of interest to indicate where the consumer desires to locate a CTM. Upon receiving an indication of interested location/area from the consumer user, the mobile payment application 104 determines one or more CTM's that are available for cash withdrawal within that area of interest. In some embodiments, the consumer user can also specify a time for the cash withdrawal. In such embodiments, the time can be submitted along with the indication of location for cash withdrawal.

As illustrated in the embodiments of FIG. 1, the mobile payment application 104 identifies a first CTM 120, a second CTM 122, a third CTM 124, and a fourth CTM 126 for the consumer, where these CTM's are located within a 5 mile radius from the mobile device 102 (i.e., from where the consumer is located). In the illustrated embodiments, the first CTM 120 is an ATM associated with a credit union, the second CTM 122 is an ATM associated with a commercial bank, the third CTM 124 is a POS system associated with a "coffee shop" merchant, and the fourth CTM 126 is a POS system associated with a "electronics shop" merchant. The mobile payment application 104 displays the four identified CTM's (e.g., 120, 122, 124, 126) to the consumer, who in turn indicates to the mobile payment application 104 (e.g., by clicking or touching a display of the mobile device 102) from which particular CTM she wishes to obtain the cash.

Based on the consumer's indication, or selection of a CTM, the mobile payment application 104 causes a transaction code 108 to be generated for the selected CTM. In some embodiments, the transaction code 108 is configured to expire at the end of a specified time period. For example, the transaction code becomes invalid upon the expiration of five minutes. In some embodiments, the specified time period is associated with the distance from which the selected CTM is located from the mobile device 102. For example, where a selected CTM is located within 0.01 mile from the mobile device 104, the code is configured to expire after 30 seconds have passed.

In some embodiments, the consumer can configure the generated code to be active for a particular specified time period. For example, the consumer is currently located in Palo Alto, Calif. and wishes to withdraw cash in Union Square, San Francisco, Calif., where she will be heading for a meeting with friends in two hours. In such an example, the consumer indicates her desired location (e.g., zip code) and desired withdrawal time, and the mobile payment application 104, in response, generates a list of CTMs located in Union Square. Upon receiving the consumer's selection of a CTM, the mobile payment application 104 generates a code that becomes active two hours later.

The mobile payment application 104 can display the generated transaction code 108 for the consumer to see on a display of the mobile device 102. The consumer can then approach the selected CTM (e.g., walk), and provide the code 108 to obtain the money 109 (i.e., cash) from the CTM. In particular, the selected CTM, upon receiving the code 108, dispenses the money 109 in an amount that is representative of the withdrawal amount the consumer has requested from the mobile payment application 104. In some embodiments, the generated code 108 is associated with the biometric information of the consumer. In such embodiments, the consumer must provide a biometric identifier that correlates with the biometric information in order for the selected CTM to dispense the money 109. The biometric identifier can be, for example, a finger, a hand, an iris, a retina, a face, or the like. For example, the code is associated with a fingerprint of the consumer. In the example, the consumer must place, for example, her finger on a fingerprint scanner coupled to the selected CTM. Upon a matching of fingerprints, the selected CTM dispenses the money 109.

After the consumer has withdrawn the cash from the selected CTM, the PSS executes, or initiates, a funds transfer between the financial account associated with the consumer and a financial account associated with the selected CTM. In various embodiments, the funds transfer involves a first transaction between the user requesting the cash withdrawal (or "requester") and the selected CTM (e.g., a coffee shop merchant), and a second transaction between the PSS and the selected CTM. In a business flow according to the CTM technology, the first transaction would be deemed a "money transaction," in which money is transferred from the selected CTM to the requester, and the second transaction would be deemed a "payment transaction," in which the PSS has collected money, e.g., from the requester, on behalf of the selected CTM, and in turn provides the money in that transaction to the selected CTM (e.g., as a reimbursement to the selected CTM for the funds dispensed to the requester)). As used here, the term "money transaction" differs from the term "payment transaction" in that the money transaction does not include the transaction fee; that is, the money transaction is a physical cash transfer from the CTM to the consumer. In contrast, the term "payment transaction" refers to a transaction that is generally larger than a money transaction, and includes a payment transaction fee. The payment transaction is a non-physical transfer from a working account of the consumer user to a working account of the CTM operator. The payment transaction fee must be large enough to cover fees intrinsic to the underlying rails (e.g., credit rails will cost more than debit rails, and book transfers and ACH are free), and to reimburse the CTM operator for his time and/or opportunity cost.

In an illustrative example, Joe Consumer requests for $20 cash out of a local cafe CTM merchant (i.e., "money transaction"). The payment service system, in response, causes $22 to be transferred from Joe Consumer's checking account, pays $1 to the financial institution that executes the debit rails for the cash transfer (e.g., Joe Consumer's bank), and pays $21 to the local café CTM merchant's account. In yet another example, the payment service system, in response to Joe Consumer's cash withdrawal of $20, causes $20 to be withdrawn from Joe Consumer's checking account, pays $1 to the financial institution executing the debit rails (e.g., Joe Customer's bank), and pays $20 to the local cafe's working account. In this example, the payment service system pays the "debit fee" (e.g., $1) on behalf of the customer, and the CTM merchant participates in the transaction for free. Such implementation results in a financial loss (e.g., $1 for the transaction) on the part of the payment service system, in exchange for a better consumer experience.

In some embodiments, the PSS initiates the funds transfer prior to the cash withdrawal. In some embodiments, the PSS initiates the funds transfer concurrent to the user's cash withdrawal. Initiation of the funds transfer involves communication between the PSS 110 and a financial system 130. The financial system 130 includes two or more financial institutions (e.g., banks) 132 with which the PSS 110 communicate to cause funds to be transferred between financial accounts associated with the parties involved in the cash withdrawal, in accordance with some embodiments of the CTM technology. Further details regarding the financial system 130 will be discussed with reference to FIG. 2.

Figure 2:
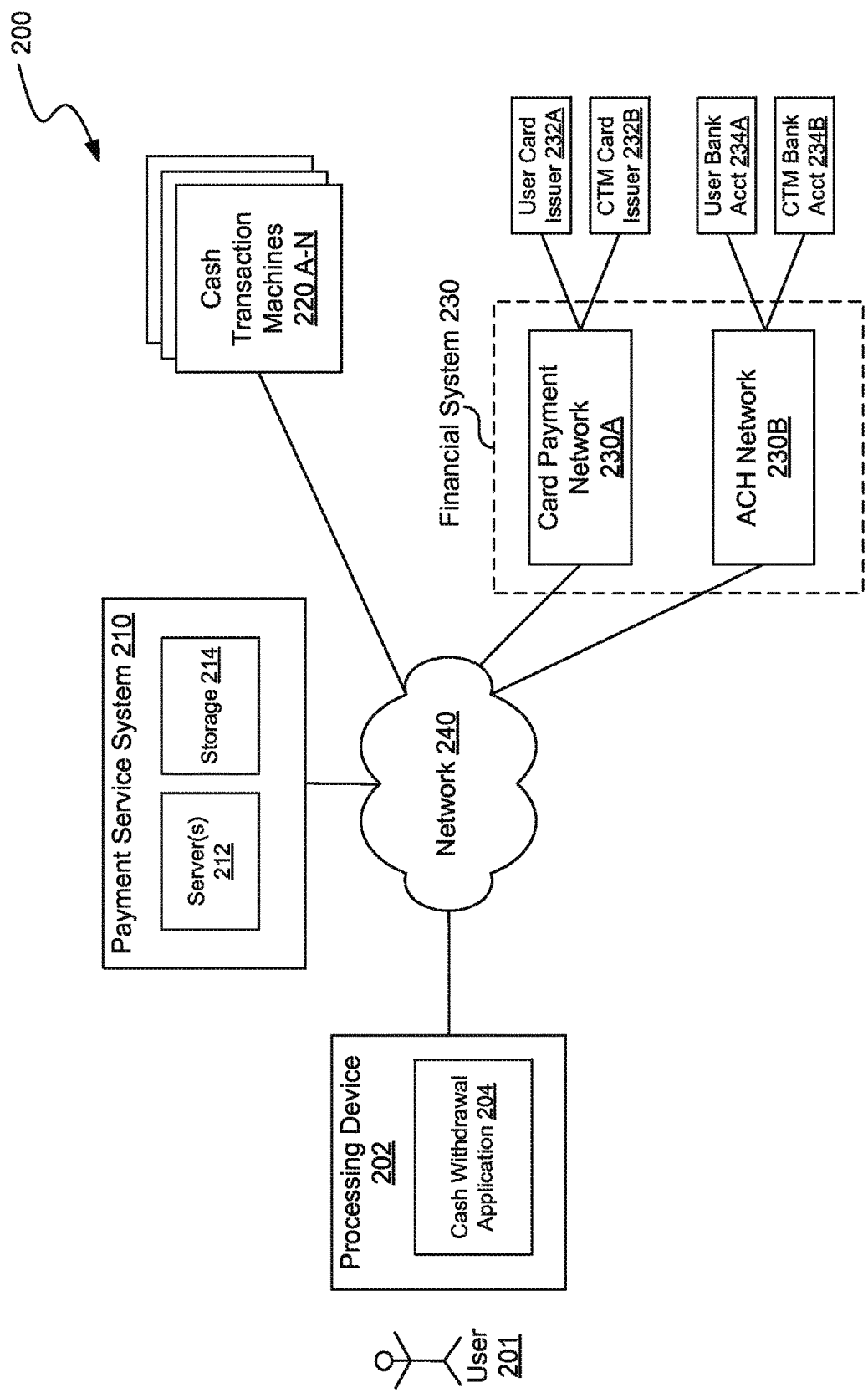
FIG. 2 is a block diagram illustrating a network-based environment in which the CTM technology can be implemented.

FIG. 2 is a block diagram illustrating a network-based environment 200 in which the CTM technology can be implemented, in accordance with some embodiments of the CTM technology. The environment 200 includes a processing device 202, a payment service system 210, one or more cash transaction machines 220 A-N ("CTM 220 A-N") (where A is 1 and N is any integer greater than 1), and a financial system 230, all of which are coupled in communication for data transmission over a network 240. The components can be connected via, for example, a twisted pair cabling network, a coax cable network, a telephone network, or any suitable type of connection network. In some embodiments, the network 240 can be wireless (e.g., which may include an IEEE 802.11 wireless network, or a data traffic network based on wireless telephony services such as 3G, 3.5G, 4G LTE and the like). One of ordinary skill in the art will understand that the components of FIG. 2 are just one implementation of the network-based environment 200 within which present embodiments may be implemented, and the various alternative embodiments are within the scope of the present embodiments. For example, the network 240 can include intervening devices (e.g., switches, routers, hubs, etc.). In some examples, the network 240 comprises the Internet.

The payment service system 210 ("PSS 210") can be, or include, one or more server computers or work stations that are employed by a payment service for facilitating software applications that function as a mechanism for consumer users to access various services, such as cash withdrawal by use of a processing device (as opposed to a physical card) at any CTM (e.g., ATMs or POS systems). In some embodiments, the PSS 210 can be the PSS 110 of FIG. 1. Although the PSS 210 is illustrated in FIG. 2 (as well as described throughout the present disclosure) as a separate entity from the processing device 202, it is noted that in some specific embodiments, both the processing device 202 and the PSS 210 can be implemented in the same processing device, such as a smartphone or a tablet computer, so that the standalone processing device can be the sole host of the environment 200 and practice the various operations of the CTM technology disclosed here.

The processing device 202, which can be used by a consumer user to communicate with the PSS 110 in requesting cash withdrawals, can be a laptop, a desktop, a tablet, a personal digital assistant ("PDA"), a smartphone, a personal computer (i.e., desktop), and the like. The processing device 202 typically includes a display that can be used to display a user interface, and can include suitable input devices (not shown for simplicity), such as a keyboard, a mouse, or a touchpad. In some embodiments, the display may be a touch-sensitive screen that includes input functionalities. A payment application 204 executes, or runs, on the processing device 202, to enable the consumer user to access a user account associated with the PSS 210. In some embodiments, access to the user account enables the consumer user to request various services facilitated by the PSS 210, such as cash withdrawal. In some embodiments, the payment application 204 has functionality similar to that of the mobile payment application 104 of FIG. 1.

Each of the one or more CTMs 220 A-N can be, or include, one or more server computer systems or work stations that are employed by a financial institution or a merchant to provide a portal from which consumer users can physically obtain cash. The financial institution can be, or include, any financial service entity, such as a credit union bank or a commercial bank. The merchant can be any business, such as a small coffee shop, a dry cleaner, a boutique clothing store, a bakery, an electronics shop, a hobby store, and the like. In the case of the CTMs being employed by a financial institution, the one or more CTMs 220A-N are in the form of ATMs. In the case of the CTMs being employed by a merchant, the one or more CTMs 220 A-N are in the form of POS systems or terminals.

As will be discussed further below, in some embodiments, a particular CTM 220A is associated with a card issuer that issues cards (e.g., debit cards), where the card issuer is capable of transferring funds to enable dispensing of cash by the CTM 220A. In one example, the card issuer is a bank associated with an ATM. In another example, the card issuer is a bank of a merchant, where that bank is associated with the POS system of the merchant. In some embodiments, a particular CTM 220A is associated with a financial institution that maintains various CTM bank accounts.

The PSS 210 can handle secure information, such as credit card numbers, bank accounts, user accounts, e.g., user identifying or profile information, debit card numbers, or other sensitive information. The PSS 210 can also handle secure information associated with the CTMs 220 A-N. Such secure information can include, for example, bank accounts associated with the CTMs A-N. Each user account maintained by the PSS 210 can be associated with one or more card accounts, e.g., debit or credit card accounts, of the user 201. A card account can be a financial account managed by a card issuer 232A and can be associated with a card number. In some embodiments, the one or more card accounts are stored by the PSS 210. Generally, the card issuer 232A issues a physical payment card for each card account.

In some embodiments, the PSS 210 can communicate with a computer system 230A of a debit card payment network. In some embodiments, the PSS 210 can communicate with a computer system of a credit card payment network, e.g., Visa® or MasterCard®. The PSS 210 can communicate with the computer system 230A over the same network 240, or over a different network. The computer system 230A of the card payment network can communicate in turn with a computer system 232A of a consumer user card issuer (e.g., a bank of the user 201) and a computer system 232B of a CTM card issuer (e.g., a bank of a merchant associated with a POS system or a bank associated with an ATM). The consumer user card issuer 232A and the CTM card issuer 232B can transfer money, e.g., over a debit payment network, in response to a request to transfer money from the PSS 210.

In some embodiments, the PSS 210 can communicate with a computer system 230B of the ACH network. The computer system 230B of the ACH network can communicate with a consumer user bank account 234A and a CTM bank account 234B (e.g., a bank account of a merchant associated with a POS system or a bank account associated with an ATM). The consumer user bank account 234A and the CTM bank account 234B can transfer money, e.g., using the ACH network, in response to a request to transfer money from the PSS 210. Note, in other embodiments, there can also be computer systems of other entities, e.g., the card acquirer, between the PSS 210 and the card issuers and between the PSS 210 and the bank accounts. Further, note that for ease of discussion, the term "financial system 230" will be used to refer to either of the card payment network 230A or the ACH network 230B, where the PSS 210 communicates with the financial system 230 in various embodiments to cause a funds transfer from a financial account of the user 201 to a financial account associated with a CTM.

In an example scenario, in order to cause a transfer of funds from a financial account associated with the user 201 to a financial account associated with a particular CTM 220A from which the user 201 withdraws the cash, the user 201 needs to submit, or enter, financial account information into the PSS 210. In some embodiments, the financial account information is included in the user account of the user 201, where that financial account information has been stored beforehand when the user 201 first registers for the user account, and is accessible by the PSS 210 when the user 201 requests for cash withdrawal. For example, when the user 201 submits login credentials to be authenticated by the PSS 210, and upon authentication, the PSS 210 accesses the financial account information to process the request for cash withdrawal. In some embodiments, the user 201 simply submits the financial account information when the user 201 requests a cash withdrawal. The financial account information can include, for example, the bank account number and routing number in the case of a bank account. In another example, the financial account information can include debit card information (e.g., debit card number, expiration date, CVV, etc.) in the case of a debit card account. In some embodiments, the financial account information can be other account information associated with a third party financial account, such as a username and password.

To cause money, or funds, to be transferred between the user 201 and any of the CTMs 220 A-N, the PSS 210 can operate as a gateway or a middleman. To operate as a gateway, the PSS 210 can identify debit card accounts for both the user 201 and a corresponding CTM 220. The PSS 210 can submit a request to an appropriate card issuer, e.g., to the card issuer of the user 201 or to the card issuer of the corresponding CTM 220, to transfer money. For example, the request can be sent over debit rails. That is, a debit card network can receive the request and can carry out the request to transfer money. The appropriate card issuer can receive and process the request by transferring money to the appropriate card account (e.g., transferred to the account of a corresponding CTM 220).

To operate as a middle man, the PSS 210 can receive the withdrawal amount as a "payment amount" by processing a card, e.g., a credit card or a debit card, of the user 201 and hold the payment amount. The PSS 210 can push the payment amount, e.g., over debit rails, to a debit account of the recipient (e.g., a corresponding CTM 220). Instead of holding the payment amount, the PSS 210 can also forward the payment amount once the recipient (e.g., the corresponding CTM 220) links an account with the PSS 210. Alternatively, the PSS 210 can generate a transaction using ACH that debits an amount from a bank account of the user 201 and can credit the amount into a recipient bank account, e.g., using ACH, or onto a debit account, e.g., over debit rails, of the recipient (e.g., the corresponding CTM 220).

Figure 3:
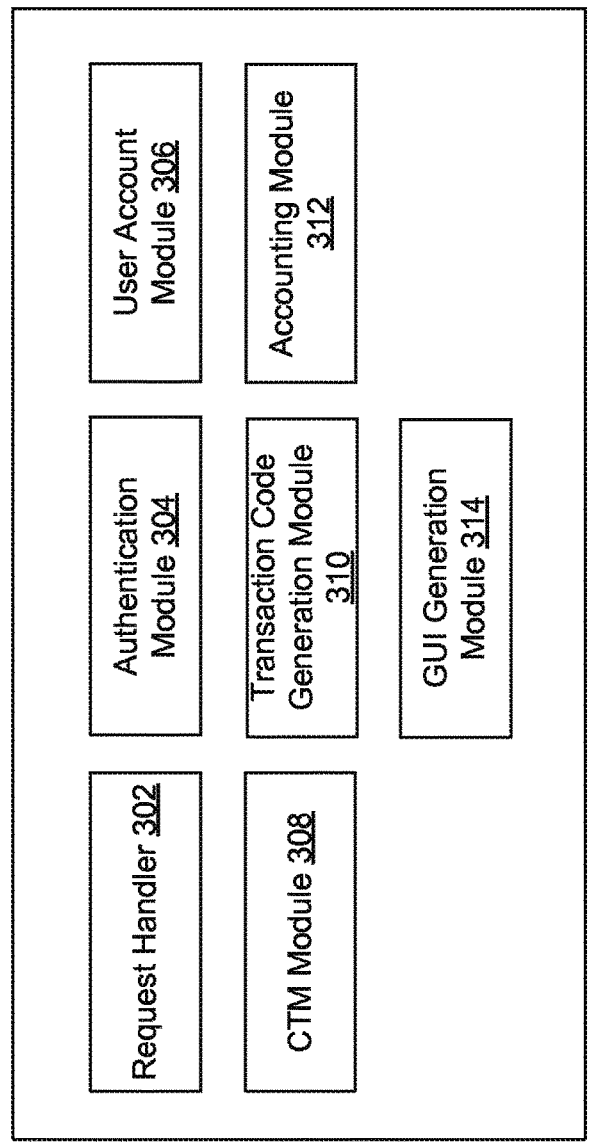
FIG. 3 is a block diagram illustrating various components and/or modules of a payment service system for executing the CTM technology.

FIG. 3 is a block diagram illustrating various components and/or modules of a payment service system 300, where the payment service system 300 can be employed by a payment service to execute various embodiments of the CTM technology. In some embodiments, the payment service system 300 ("PSS 300") can be the PSS 210 of FIG. 2. In some embodiments, the PSS 300 can be the PSS 110 of FIG. 1. According to the embodiments illustrated in FIG. 3, the PSS 300 includes a request handler 302, an authentication module 304, a user account module 306, a CTM module 308, a code generation module 310, an accounting module 312, and a graphical user interface (GUI) generation module 314. Other embodiments of the CTM technology may include some, all, or none of these modules and/or components along with other modules, applications, and/or components. Some embodiments may incorporate two or more of these modules and components into a single module and/or associate a portion of the functionality of one or more of these modules with a different module. For example, in some embodiments, the authentication module 304 and the user account module 306 can be combined into a single module for authenticating a user. In another example, in some embodiments, the request handler 306, the user account module 306, the CTM module 308, and the accounting module 312 can be combined into a single module for enabling a user to withdraw cash from one or more CTMs. In yet another example, in some embodiments, the request handler 306, the CTM module 308, the code generation module 314, and the accounting module 312 can be combined into a single module for facilitating the cash withdraw from the one or more CTMs.

The request handler 302 can receive consumer users' requests for cash withdrawals at one or more CTMs, and process those requests on behalf of the consumer users. In some embodiments, the request handler 302 receives a particular request for cash withdrawal from a consumer user via a payment application installed on the user's processing device, where the payment application is associated with the PSS 300 (e.g., sends and receives messages and/or instructions from the PSS 300).

In some embodiments, before being able to request a cash withdrawal, the consumer user needs to be authenticated, where such an authentication process is performed by the authentication module 304. In some embodiments, the authentication module 304 performs authentication by analyzing login credentials provided by the consumer user through the payment application. In some embodiments, the login credentials include a username and password. In some embodiments, the login credentials include biometric information associated with the user (e.g., iris, fingerprint, voice, etc.). The authentication module 304 can perform authentication using other methodologies other than those discussed here. For example, in some embodiments, the authentication module 304 uses a password-less authentication scheme involving a verification of a token (e.g., cookie, security code, etc.) received from the payment application installed on the consumer user's processing device. In other embodiments, the consumer user can make the request for cash withdrawal without any authentication needed (e.g., the consumer user creates a user account with the PSS 300 after and/or during the cash withdrawal request).

The user account module 306 can maintain user account information, such as user accounts (e.g., username and password), user profile and/or user personal identifying information (e.g., name, telephone, email address, biometric information), payment card information (e.g., debit/credit card numbers, expiration date, CVV, billing address, etc.), financial account information (e.g., account number, routing number, etc.), or other account information. The user account module 306 can associate each user account with one or more payment card accounts of the user, and store the associations e.g., in a memory. A payment card account can be a financial account managed by a card issuer (which issues a physical payment card for each card account), and can be associated with a card number. As used in the examples and throughout the following description, the term "payment card" refers to a payment mechanism that includes a debit card, a credit card, a pre-paid gift card, a "smartcard" that has embedded integrated circuit chips (e.g., a Europay-MasterCard-Visa (EMV) card), a proxy card, or any financial instrument that functions as a combination of any of these mechanisms.

In some embodiments, the user account module 306 can register the consumer user with the payment service (and/or the PSS 300) if the consumer user has not been previously registered. In such embodiments, the user account module 306 works in coordination with the request handler 302 to prompt the consumer user to enter payment card account information, which can be used to create a new user account for processing various services for the consumer user, such as the cash withdrawal transaction.

The CTM module 308 can manage one or more CTM accounts associated with one or more CTMs that are configured to dispense cash in accordance with the CTM technology. Management of the CTM accounts can include enrollment of the CTMs with the PSS 300, e.g., to create and/or register individual business accounts with the PSS 300 for the CTMs. In some embodiments, enrollment includes requesting each enrolled CTM to submit, to the PSS 300, financial account information sufficient to conduct the cash withdrawal transactions according to the CTM technology ("CTM transactions"). For example, an administrator of a particular CTM can enter a bank account number and a routing number into an application that is configured to communicate with the PSS 300 (e.g., an application 502 of FIG. 5). In another example, the administrator of the particular CTM can enter a financial account identifier associated with the particular CTM (e.g., a string of numeric characters or a string of alphanumeric characters). In some embodiments, enrollment also includes requesting each enrolled CTM to submit details and/or information about the CTM (e.g., address, business operating hours, merchant information, financial institution information, etc.). In some embodiments, a CTM may choose to further submit advertisement information to the PSS 300, which in turn can display, for example, that information via the payment application executing on the processing device of the consumer user.

In some embodiments, the CTM module 308 tracks cash balances available at the enrolled CTMs. The cash balance can be used as a criterion in identifying a CTM for the user upon a cash withdrawal request, which will be discussed in more detail below. In some embodiments, tracking the cash balance at a merchant-based CTM involves the CTM module 308 communicating with the merchant-based CTM throughout the day to receive a cash balance available at that CTM. In an event the cash balance falls below a threshold, the CTM module (and/or the payment service system 300) eliminates that CTM from participation in the cash withdrawal process. That is, in identification of available CTMs for the user, the merchant-based CTM with a below-threshold cash balance, for example, would not show up in the search results.

In some embodiments, the CTM module 308 can function as a CTM locator to identify one or more CTMs for the user. The CTM module 308 can identify the CTMs based on a current location of the user (i.e., the user's mobile device). The current location can be determined, for example, based on location data, or information received from the user's device (e.g., mobile device). Alternatively, the CTM module 308 can identify the CTMs based on a location specified by the user (e.g., via a zip code).

The transaction code generation module 310 ("code generation module 310") can generate a unique code for a specific CTM from which the consumer user can withdraw cash. The code generation module 310 can generate the code based on a variety of information associated with the consumer user, including, for example, a mobile device ID, an IP address, an application ID, an application activity (e.g., request of $50, user account, etc.), device characteristics (e.g., memory, processor, etc.), biometric information, and/or other user-related information. In some embodiments, the code generation module 310 can generate the code based on a code generation scheme configured in coordination with a particular CTM to which the code corresponds. In some embodiments, the code generation scheme can be based on an encryption protocol. In some embodiments, the code generation scheme can be based on personal identifying information of the user (e.g., biometric information). The code generation module 310 can transmit the generated code (e.g., via a communications module) to a processing device of the consumer user. In some embodiments, the code generation module 310 can also transmit the generated code to the particular CTM to which the code corresponds. In such embodiments, the particular CTM receives the code accompanied by data indicating that the code corresponds to the consumer user and/or the cash withdrawal request. When the consumer user submits a matching code at the particular CTM, the particular CTM can dispense cash.

The accounting module 312 can track various financial transactions. For example, in some embodiments, the payment service associated with the PSS 300 may charge for the cash withdrawal service, where that charge is tracked by the accounting module 312. In other embodiments, for example, the accounting module 312 can ensure that funds representative of the withdrawal amount are properly deducted from the consumer user's financial account and credited and/or deposited into a financial account associated with the particular CTM.

The GUI generation module 314 can generate one or more GUI screens that allow for interaction with an administrator user of the PSS 300. In some embodiments, the GUI generation module 314 generates a graphical user interface allowing an administrator user of the PSS 300 to configure preferences, set authentication standards, set rules, set constraints, customize messages, and/or otherwise receive or convey information to the user.

Figure 4:
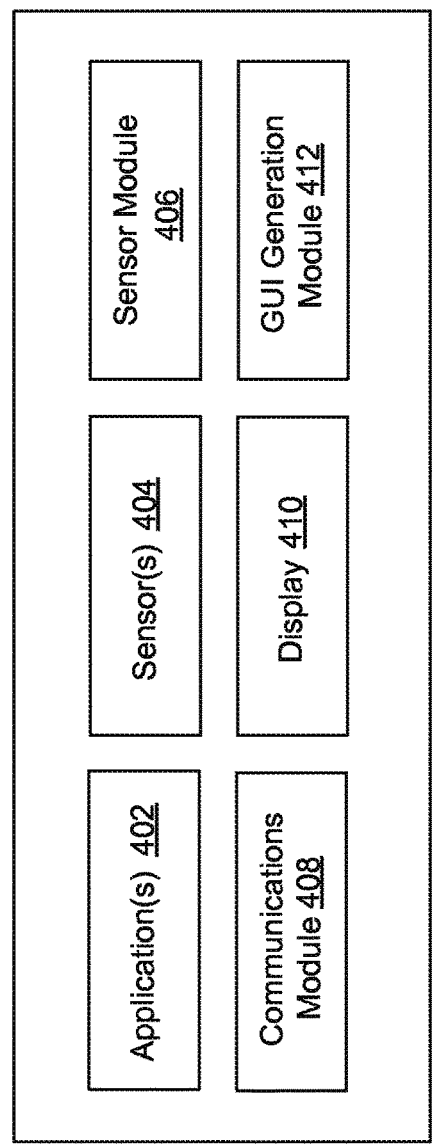
FIG. 4 is a block diagram illustrating various components and/or modules of a mobile payment application installed on a mobile device for executing the CTM technology.

FIG. 4 is a block diagram illustrating various components and/or modules of a processing device 400, in accordance with some embodiments of the CTM technology. In some embodiments, the processing device 400 can be the mobile device 102 of FIG. 1. In some embodiments, the processing device 400 can be the processing device 202 of FIG. 2. In accordance with the embodiments illustrated in FIG. 4, the processing device 400 includes an application 402, one or more sensors 404, a sensor module 406, a communications module 408, a display 410, and a graphical user interface (GUI) generation module 412. Note that the processing device 400 in FIG. 4 can have more or fewer components and/or modules than shown, or a different configuration of components and/or modules. The various components and/or modules shown in FIG. 4 can be implemented by using hardware, software, firmware or a combination thereof, including one or more signal processing and/or application specific integrated circuits.

In accordance with various embodiments, the processing device 400 can have one or more applications 402 that allow a user to access and interact with various service providers, such as a payment service provider (or payment service). For example, the one or more applications 402 can include a payment application (e.g., that enables the user to request cash withdrawal, to transfer money, etc.), a banking application, a social networking application, a gaming application, and/or the like. The one or more applications 402 can access a server associated with a service provider to retrieve user account details (e.g., the PSS 110 of FIG. 1).

In some embodiments, before gaining access, a user of a particular application 402 needs to be authenticated. The one or more applications 402 can request a user to submit login credentials to authenticate the user before allowing access. Once the user is authenticated, the application 402 can process one or more requests from the user, e.g., a cash withdrawal request, by using the login credentials and/or other user profile information associated with the authenticated user account.

The one or more sensors 404 can include location sensors (e.g., a GPS sensor, a BLE sensor, a proximity sensor, an accelerometer, etc.). The location sensors can sense and/or collect location data based on a physical attribute (e.g., orientation, position, or acceleration) or its derivative (e.g., a first derivative or a second derivative) relating to the processing device 400, where the physical attribute or its derivative is indicative of a current physical location of the processing device 400. The current physical location can be determined based on the location data, where the current physical location can be used to identify one or more CTMs for the user. The location data can be continuously updated and stored in a storage device (e.g., a flash storage or other persistent storage device). Various different mechanisms may be used to determine the current physical location based on the location data, including, but not limited to the following:

Geo-fencing;

Geo-IP Reverse lookups of the IP address of the processing device 400 to determine a coarse approximation of the location of the processing device 400;

Cellular Signal Strength Triangulation involving integration between the processing device 400, a server (e.g., associated with the PSS 110 of FIG. 1), and wireless carrier infrastructure; and Wi-Fi Access Point Triangulation involving nearby Wifi access points with known physical locations.

In some embodiments, the one or more sensors 404 can also include biometric sensors that read raw biometric information, or data, from a user of the processing device 400 (e.g., capture the user's fingerprint, record the user's voice, snap a photo of the user, etc.). In some embodiments, the biometric data can be used in an enrollment process (e.g., with a service provider) in which the user enrolls a fingerprint, voice sample, image or other biometric data with the processing device 400. The enrolled biometric data can then be used for providing secure user authentication over a network using biometric sensors at a later time. For example, the user can be authenticated by providing new biometric data, for example by offering a biometric identifier (e.g., finger or voice), which gets sent over a network to authenticate the user with a remote server (e.g., the PSS 110 of FIG. 1) by, e.g., comparing the newly received biometric data with the enrolled biometric data).

The sensor module 406 can control the one or more sensors 404 of the processing device 400. The sensor module 406 records a sequence of values measured, or sensed, by the one or more sensors 404 (e.g., location data, biometric data, etc.) The sensor module 406 can run on a kernel level of the operating system of the processing device 400.

In some embodiments, a particular application 402 works in coordination with the sensors 404 and the sensor module 406 to detect, or identify, one or more CTMs located near the processing device 400. The particular application can be, e.g., a mobile payment application 402 installed on a mobile device. In some embodiments, the mobile payment application 402 can identify the CTMs by communicating with a PSS (e.g., the PSS 110 of FIG. 1) through, e.g., a payment application 402 installed on a conventional personal computer (PC), without use of the sensors 404 and/or the sensor module 406.

The mobile payment application 402 is capable of performing one or more functions that facilitate a cash withdrawal transaction, or CTM transaction, in accordance with the CTM technology. For example, in some embodiments, the mobile payment application 402 enables the user to submit a cash withdrawal request, displays for the user a list of one or more CTMs from which to withdraw the cash, and generates and/or provides a generated code for a CTM (or a list of codes for the list of CTMs) to enable the user to withdraw cash at that CTM. In such embodiments, the mobile payment application 402 communicates with the PSS (e.g., PSS 110 of FIG. 1) and one or more CTMs to facilitate the CTM transaction. For example, the mobile payment application 402 generates a code for a particular CTM from which the user can withdraw cash. The mobile payment application 402 can also transmit the code to the particular CTM with data accompanying the code to indicate, to the particular CTM, the identity of the user and/or the cash withdrawal request associated with the code.

In some embodiments, the mobile payment application 402 provides the user with a check-in feature that enables automatic utilization of the code when the user is nearby a particular CTM. For example, the mobile payment application 402 can store the generated code at the mobile device until the user "checks-in" physically at the particular CTM, e.g., by launching the "check-in feature" of the mobile payment application 402. In particular, the mobile payment application 402 checks in at the particular CTM based on geofence and presents the generated code via radio when the user is within proximity to the CTM. This would be beneficial, for example, with a merchant-based CTM (e.g., POS) that alerts a human merchant operating the CTM that a user has entered the human merchant's store to request cash withdrawal.

The communications module 408 can enable the processing device 400 to communicate with one or more remote devices or systems (e.g., the PSS 110 of FIG. 1) via a network, through any known and/or convenient communications protocol supported by the processing device 400 and the remote entities. The communications module 408 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

The display 410 can be, for example, a touchscreen display, or a traditional non-touch display (in which case the processing device 400 likely also includes a separate keyboard or other input device). The GUI generation module 412 is similar to the GUI generation module 314. The GUI generation module 412 can generate one or more GUI screens that allow for interaction with a consumer user of a PSS (e.g., the PSS 110 of FIG. 1 or the PSS 210 of FIG. 2). In some embodiments, the GUI generation module 412 generates a graphical user interface allowing a user of the processing device 400 to configure preferences and authentication standards, set rules, set constraints, customize messages, make requests, and/or otherwise receive or convey information to the user. FIGS. 7A-7C illustrate various examples of graphical user interfaces that can be generated by the GUI generation module 412.

Figure 5:
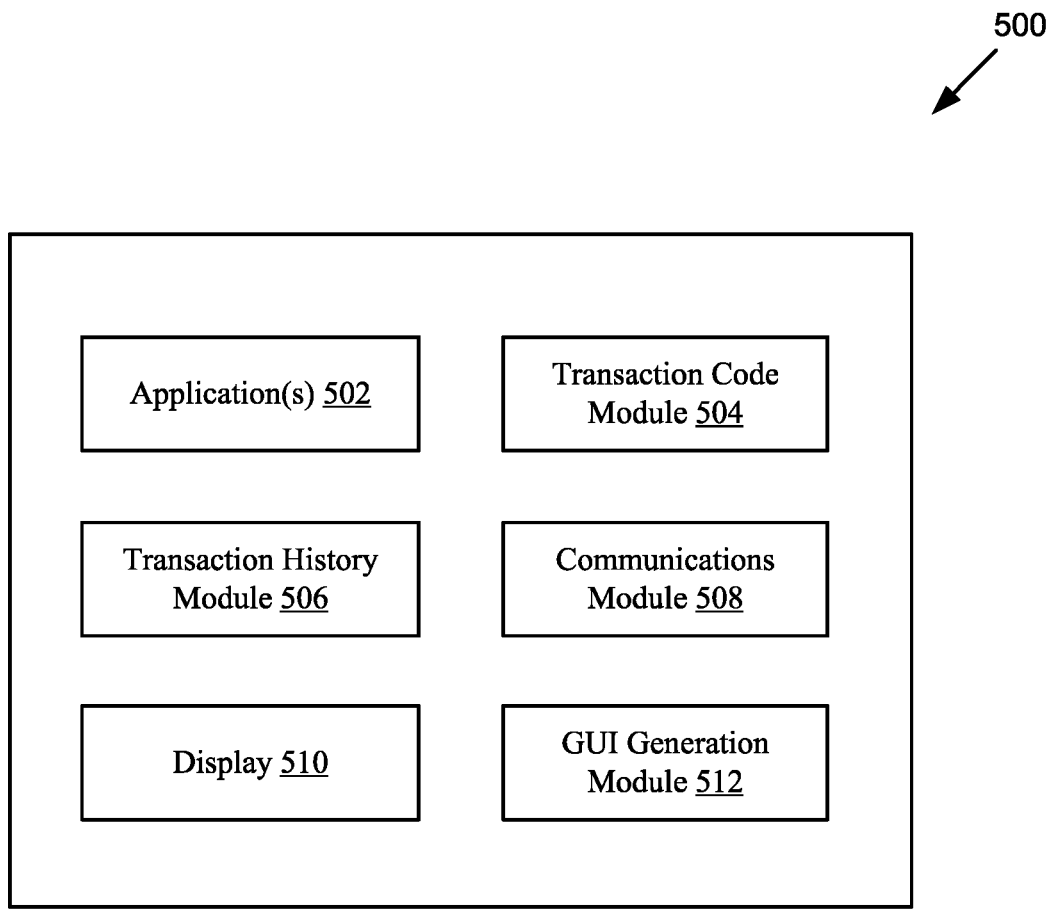
FIG. 5 is a block diagram illustrating various components and/or modules of a transaction machine application installed on a transaction machine for executing the CTM technology.

FIG. 5 is a block diagram illustrating various components and/or modules of a CTM 500. In some embodiments, the CTM 500 can be the CTM 220 of FIG. 2. In some embodiments, the CTM 500 can be the CTM 120 or the CTM 122 of FIG. 1, which are automated teller machines (ATMs) associated with different financial institutions (e.g., a credit union and a commercial bank). In some embodiments, the CTM 500 can be the CTM 124 or the CTM 126, which are POS systems or terminals associated with different merchants (e.g., a coffee shop and an electronic shop). In accordance with the embodiments illustrated in FIG. 5, the CTM 500 includes an application 502, a transaction code module 504, a transaction history module 506, a communications module 508, a display 510, and a graphical user interface (GUI) generation module 512. Note that the CTM 500 in FIG. 5 can have more or fewer components and/or modules than shown, or a different configuration of components and/or modules. The various components and/or modules shown in FIG. 5 can be implemented by using hardware, software, firmware or a combination thereof, including one or more signal processing and/or application specific integrated circuits.

In accordance with various embodiments, the CTM 500 can have one or more applications 502 that allow a user to access and interact with various services provided by the CTM 500 and/or other service providers working in coordination with the CTM 500. For example, in some embodiments where the CTM 500 is an ATM associated with a financial institution, the one or more applications 502 can include a cash withdrawal application (e.g., an application configured to dispense cash to non-members and members of the financial institution), a banking application (e.g., an application configured to provide banking needs to members of the financial institution), and/or the like. In another example, in some embodiments where the CTM 500 is a POS system associated with a merchant, the one or more applications 502 can include a cash withdrawal application (e.g., an application configured to dispense cash upon request), a transaction processing application (e.g., an application configured to process payment transactions between a merchant and customers/consumers for sale of goods/services), and/or the like. In some embodiments, the one or more applications 502 can communicate with a server associated with a service provider, such as a PSS associated with a payment service provider (or payment service), to process various transactions, such as cash withdrawal transactions. In such embodiments, the one or more applications 502 can include, e.g., a cash withdrawal application 502, as henceforth assumed here to facilitate description.

In some embodiments, the transaction code module 504 included in the CTM 500 can communicate with the cash withdrawal application 502 to facilitate cash withdrawal transactions. The transaction code module 504 can also communicate with the display 510, either directly or through the cash withdrawal application 502. For example, the transaction code module 504 communicates with the display 510 to receive one or more transaction codes from a user using, e.g., a touchscreen functionality of the display 510. As illustrated in FIG. 5, the transaction code module 504 can be logically separate from the cash withdrawal application 502. Alternatively, the transaction code module 504 can be an integral part of the cash withdrawal application 502. Other alternatives include binding virtual USB devices or implementing the transaction code module 504 as a separate hardware device that connects to the CTM 500.

In some embodiments, the transaction code module 504 has two main functions. First, it generates one or more transaction codes that are configured to correspond to, and/or comprehended by a processor of, the CTM 500. Second, the transaction code module 504 verifies transaction codes received by the CTM 500 to determine whether those codes correspond to codes specific to the CTM 500. These functions of the transaction code module 504 enable a user to withdraw cash physically from the CTM 500 by using his/her processing device to locate the CTM 500, request the code, and receive the cash, without the need to carry a physical card (e.g., ATM card), to be a member/account holder at a particular financial institution (e.g., in a scenario where the CTM 500 is an ATM), or to make a an actual purchase (e.g., in a scenario where the CTM is a POS system of a merchant).

Accordingly, in an example cash withdrawal transaction according to the CTM technology (a "CTM transaction"), a user, who has received a transaction code through her mobile device, submits the code to the CTM 500. The transaction code can be generated by the transaction code module 504 using an encryption protocol. Alternatively, the generated transaction code can simply be a pseudo-random number and/or a string of alphanumeric characters. The transaction code module 504 can transmit the generated code to the PSS, which forwards the code to the processing device of the user (e.g., via the application 402 of FIG. 4).

Upon receiving the generated code, the user can then submit the code to the CTM 500 directly by entering the code via a graphical user interface of the cash withdrawal application 502 executing on the CTM 500 (e.g., at an ATM), or indirectly through an operator of the CTM 500 entering the code (e.g., a sales clerk at a POS system). Upon receiving the code through the cash withdrawal application 502, the transaction code module 504 can verify the code by using a decryption protocol, where the decryption protocol corresponds to the encryption protocol used to generate the code for the user. Alternatively, the transaction code module 504 can verify the code by performing a comparison between a set of one or more generated codes (for a corresponding set of users) and the code received via the application 502. Upon verification of the received code, the transaction code module 504 triggers cash to be dispensed to the user (e.g., by communicating with a dispenser mechanism (not shown)).

In some embodiments, the transaction code module 504 verifies the identity of the user in addition to verifying the code. In some embodiments, the transaction code module 504 communicates with the PSS (e.g., via the communications module 508) to receive identifying information of the user. In some embodiments, the identifying information is integrated into the transaction code during the generation of such code. Upon receipt of the generated code from the user at the CTM 500, the transaction code module 504 verifies the received code by verifying the identity of the user physically located at the CTM 500. For example, in some embodiments, the CTM 500 prompts the user to submit a biometric identifier (e.g., via a fingerprint scan, an iris scan, a facial recognition scan, etc.).

In some embodiments, the transaction code module 504 has only one main function: to verify transaction codes received at the CTM 500. In such embodiments, the transaction code is generated by a PSS (e.g., the PSS 110), which communicates the generated code to the CTM 500 (e.g., via the communications module 508) and the user (e.g., at the user's mobile device). Upon receiving a particular code from the user at a physical location of the CTM 500, the code is sent to the transaction code module 504 for verification. The transaction code module 504 verifies a particular code by using a code generation scheme configured in coordination with the PSS. In some embodiments, the code generation scheme can be based on an encryption protocol. In some embodiments, the code generation scheme can be based on identifying information of a user (e.g., biometric information).

The transaction history module 506 tracks and stores transactions conducted by the CTM 500. For example, in some embodiments, the transaction history module 506 records details about the CTM transaction discussed in the above example (e.g., withdrawal amount, date, time, transaction ID, transaction code, etc.). In some embodiments, the transaction history module 506 communicates with the PSS (e.g., PSS 110 of FIG. 1) to facilitate reimbursement payments to the CTM 500 for the funds (i.e., withdrawal amount(s)) dispensed to users of the payment service that employs the PSS. For example, in some embodiments, the transaction history module 506 sends a record of the transaction(s) to the PSS to request reimbursement. In another example, in some embodiments, the transaction history module 506 is able to verify a reimbursement payment received from the PSS based on the transaction history maintained by the transaction history module 506.

The communications module 508 enables communication, via a wireless and/or wired communications network, between the CTM 500 and remote computer systems, such as the PSS (e.g., PSS 110 of FIG. 1) or a processing device of the user requesting cash withdrawal (e.g., device 102). The display 510 can be, for example, a touchscreen display, or a traditional non-touch display (in which case the CTM 500 likely also includes a separate keyboard or other input device). The GUI generation module 512 can generate one or more GUI screens that allow for interaction with a user of the CTM 500 (e.g., a consumer user requesting cash withdrawal or an operator of the CTM 500, such as a sales clerk). The GUI generation module 512, in some embodiments, generates a graphical user interface allowing a user of the CTM 500 to select application functionality and/or otherwise receive or convey information to the user.

Figure 6:
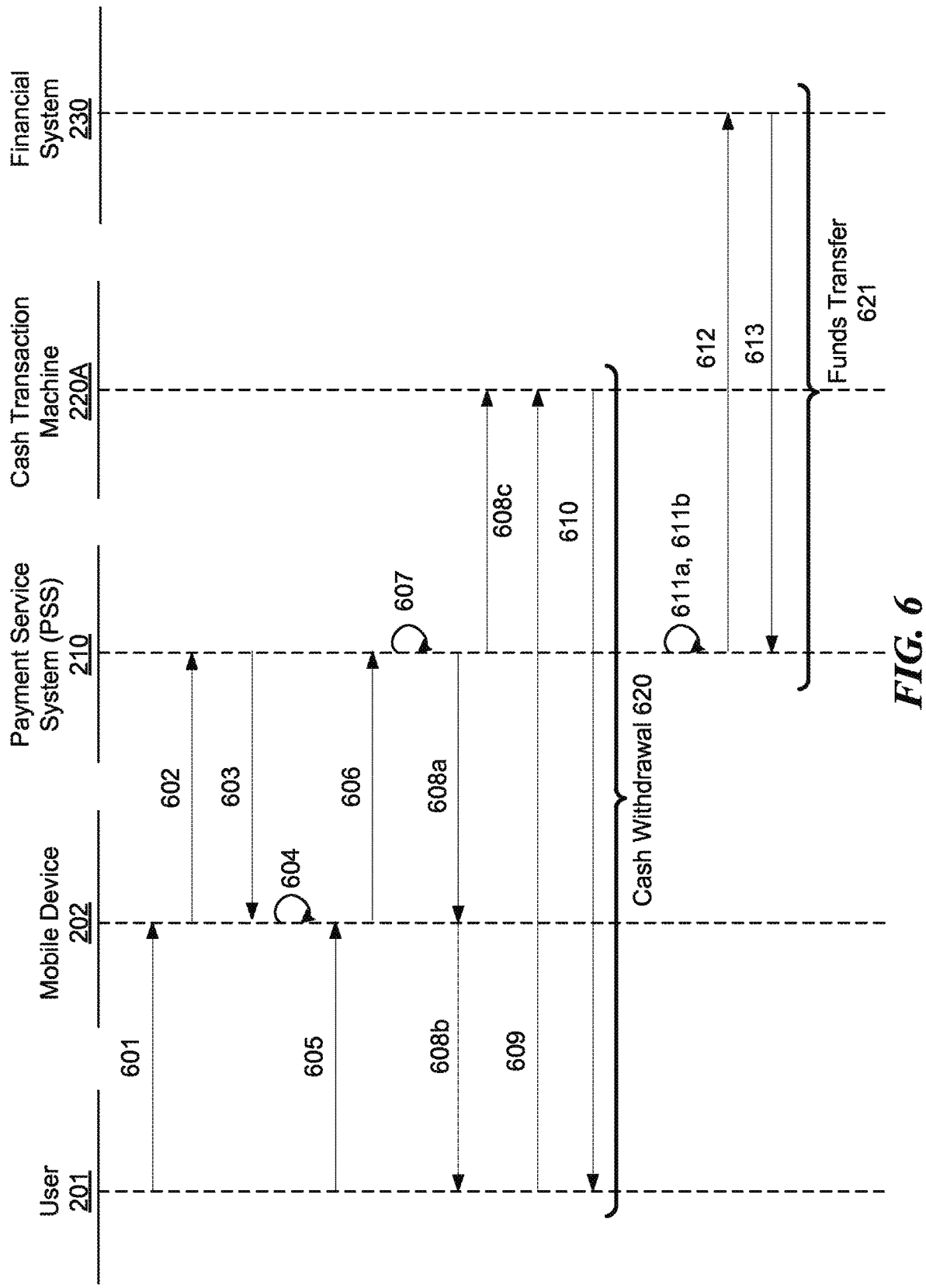
FIG. 6 is a sequence diagram illustrating a process for withdrawing cash by use of the CTM technology.

FIG. 6 is a sequence diagram illustrating various operations performed in a cash withdrawal in accordance with some embodiments of the CTM technology. For ease of understanding, the operations in the following description are apportioned into two phases: a cash withdrawal phase 620; and a funds transfer phase 621. The operations illustrated in FIG. 6 involve communication between the user 201, the mobile device 202 belonging to the user 201, the PSS 210, a particular CTM 220A, and the financial system 230. The PSS 210 can be configured to send and receive communications to and from the mobile device 202 and the CTM 220A. The communications can be encrypted using secure protocols built into the mobile device 202, the PSS 210, and the CTM 220A. In some embodiments, this process is implemented through a mobile payment application installed on the mobile device 202 (e.g., the application 402 of FIG. 4) and a transaction machine application installed on the CTM 220A (e.g., the application 502 of FIG. 5).

In the cash withdrawal phase 620, the user 201 initially launches the mobile payment application on the mobile device 202, which displays a graphical user interface (GUI) that includes various services, including cash withdrawal. Such a GUI is shown in FIG. 7A. The user 201 then inputs a request 601 into the mobile device 202 to search for a nearby CTM for withdrawing cash. The request may be sent automatically, for example, when the user submits a withdrawal amount into a GUI of the mobile payment application on the mobile device 202. An example of such a GUI is shown in FIG. 7B.

The mobile device 202 sends (step 602) the request to the PSS 210 via an internetwork. The request can be accompanied by location information (or geographical information) of the mobile device 202, e.g., as detected by one or more sensors in the mobile device 202. In some embodiments, the mobile device 202 also sends personal identifying information in the request to the PSS 210. In some embodiments, the personal identifying information includes the user's name, financial account number (e.g., credit or debit card number), and biometric information, including photo, voice, fingerprint, and the like. In some embodiments, the biometric information can be detected, or collected, via one or more sensors in the mobile device 202. The personal identifying information may be encrypted such that it can only be decrypted by the PSS 210.

Upon receipt of the request from the mobile device 202, the PSS 210 selects one or more CTMs based on the location information from the user 201 and the stored location information for the CTMs. The PSS 210 sends (step 603) an identification of the one or more CTMs and the location information for the CTMs to the mobile device 202. The mobile device 202 receives the information from the PSS 210, and displays (step 604) the one or more nearby CTMs and their associated location information on a GUI on the display of the device 202 for the user 201. An example of such a GUI is shown in FIG. 7C. In some embodiments, the mobile payment application installed on the device 202 identifies the CTMs for the user by using, for example, the location information. In such embodiments, once the CTMs are identified, the mobile device 202 displays the CTMs through a GUI of the mobile payment application on the display of the device 202.

Next, the user 201 can specify (step 605) which one of the displayed nearby CTMs she wishes to withdraw the cash by selecting a particular CTM from the displayed list of CTMs. For example, the user 201 touches "Bernice Café" displayed in the GUI by the mobile device 202. In another example, where the mobile device 202 is a conventional PC, the user 201 uses a computer mouse to click "Bernice Café." The mobile device 202 transmits (step 606) the selection of the user 201 to the PSS 210. The PSS 210, in response, generates (step 607) a code that corresponds to the selected CTM, such as the CTM 220A, and transmits (step 608a) that code to the mobile device 202 for display on a GUI to the user 201. The user 201 can view the code (step 608b) and use it to withdraw cash (step 609) from the selected CTM 220A.

In some embodiments, the PSS 210 also transmits (step 608c) the code to the CTM 220A. The code can be used by the CTM 220A to verify the identity of the user 201 and the withdrawal amount for processing of the request for cash withdrawal. The CTM 220A, upon receiving the code from the user 201, can dispense the cash (step 610) to the user, where the cash is representative of the withdrawal amount requested by the user 201 (via the mobile payment application on the mobile device 202).

In some embodiments, the PSS 210 also transmits to the CTM 220A the personal identifying information of the user 201, where that information may be encrypted such that it can only be decrypted by the CTM 220A, where the information cannot be accessible by any other party (e.g., intervening computer system or human). The CTM 220A can further verify the identity of the user 201 based on the personal identifying information (in addition to the code). In one example, the CTM 220A receives a biometric identifier in the form of a photo of the user 201 taken in real-time at the physical location of the CTM 220A, and verifies the identity of the user 201 by confirming that the newly taken photo matches the photo included in the personal identifying information received from the PSS 210. In another example, the CTM 220A prompts the user 201 to provide a biometric identifier in the form of her finger (e.g., placing it on a fingerprint scanner communicatively coupled to the CTM 220A), and verifies the identity of the user 201 by confirming that the biometric identifier (e.g., newly scanned fingerprint) matches the fingerprint included in the received personal identifying information. Assuming the biometric identifier matches the personal identifying information, more particularly the biometric information, of the user 201, the CTM 220A dispenses cash to the user 201 (step 610). As used here, the term "matches" refers to any identified correlations between two pieces of data, and does not necessarily refer to an exact match.

In the funds transfer phase 621, the PSS 210 identifies (step 611a) a financial account associated with the user 201 ("user financial account") who has requested the cash withdrawal (in step 601). In some embodiments, the PSS 210 identifies the user financial account by first determining a user account associated with the user 201, where that user account is registered with the PSS 210. The PSS 210 then identifies a financial account that is associated with that registered user account, where that financial account is the user financial account. In some embodiments, the user 201 may not have a user account registered with the PSS 210. In such embodiments, the PSS 210 causes a message to be sent to the mobile device 202, where the message prompts the user 201 to submit financial account information for a particular financial account that can be used to process the cash withdrawal request.

The PSS 210 also identifies (step 611b) a financial account associated with the CTM 220A (CTM financial account). In some embodiments, the PSS 210 identifies the user financial account by first determining a registered user account that is associated with the CTM 220A, and then identifying a financial account that is associated with that registered user account, where that financial account is the CTM financial account. In some embodiments, the CTM 220A may not have a user account registered with the PSS 210. In such embodiments, the PSS 210 causes a message to be sent to the CTM 220A to prompt the CTM 220A to provide financial account information for a particular financial account that can be used to process the cash withdrawal request.

Upon identification of the user financial account and the CTM financial account, the PSS 210 communicates (step 612) with the financial system 230 to initiate the funds transfer between the user financial account and the CTM financial account. Initiating the funds transfer involves the PSS 210 causing a first funds amount to be withdrawn from the user financial account, and further causing this amount to be deposited into a financial account associated with the PSS 210 (e.g., a bank account belonging to the payment service employing the PSS 210). This can be executed, for example, by the PSS 210 transmitting onto a network a standard authorization request to a card payment network (e.g., a debit card payment network), which communicates with an issuing bank associated with the user (which is part of the financial system 230), where the bank transfers (step 613) the funds to the financial account associated with the PSS 210. The first funds amount withdrawn and deposited corresponds to the withdrawal amount of cash that the user 201 has obtained from the CTM 220A.

Additionally, initiating the funds transfer further involves the PSS 210 causing a second funds amount, or reimbursement funds amount, to be withdrawn from the financial account associated with the PSS 210, and further causing the reimbursement funds amount to be deposited into the CTM financial account. This can be executed, for example, by the PSS 210 transmitting onto a network a standard authorization request to a card payment network (e.g., a debit card payment network) of the financial account associated with the PSS. That card payment network can then communicate with an issuing bank associated with the PSS 210, where the bank transfers the funds to the financial account associated with the selected CTM. The reimbursement funds amount being withdrawn and deposited corresponds to the withdrawal amount of cash that the user 201 has obtained from the selected CTM.

As used here, the term "CTM financial account" (e.g., a financial account associated with the CTM 220A) can be any account associated with the CTM (e.g., financial institution or merchant) that can receive funds. In one example, the CTM financial account can be a merchant's bank account, a merchant's credit union account, or a financial account maintained by a third party for the benefit of the merchant, such as a financial account maintained by the PSS 210. When the CTM financial account is maintained by a third party, the third party can hold funds for the benefit of the merchant. In another example, the CTM financial account can be a financial institution's bank account, a financial institution's credit union account, or a financial account maintained by a third party for the benefit of the financial institution, such as a financial account maintained by the PSS 210. When the CTM financial account is maintained by a third party, the third party can hold funds for the benefit of the financial institution.

As used here, the term "user financial account" can be any account associated with a consumer user that can receive funds. The user financial account can be, for example, the consumer user's bank account, the consumer user's credit union account, or a financial account maintained by a third party for the benefit of the consumer user, such as a financial account maintained by the PSS 210. When the financial account is maintained by a third party, the third party can hold funds for the benefit of the consumer user.

Regarding the process 600, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Any specific numbers noted herein are only examples; alternative implementations can employ differing values or ranges.

Further, while the sequence diagram presented herein shows an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

Regarding the processes discussed throughout (e.g., in reference to FIG. 1, FIG. 6, etc.), while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

FIGS. 7A-7C are user interface diagrams illustrating various example screen displays that can be generated by a consumer user's processing device to enable the CTM technology. FIG. 7A illustrates a GUI that can be generated on a display of the processing device to present the consumer user with various services offered by the payment service employing the PSS (e.g., PSS 210 of FIG. 2). FIG. 7B illustrates a GUI that can be generated on a display of the processing device to prompt the consumer user for a withdrawal amount to request cash withdrawal from a CTM. For example, the consumer user can request the cash withdrawal by entering a numerical value and selecting the "Withdrawal" action button. FIG. 7C illustrates a GUI that can be generated on a display of the processing device to present to the consumer user a list of CTMs identified for the consumer user. The consumer user can, for example, select a CTM from the list to withdraw cash at the physical location of that CTM. In some embodiments, the GUI of FIG. 7C can include the list of CTMs sorted based on transaction fees charged by the different CTMs.

Figure 8:
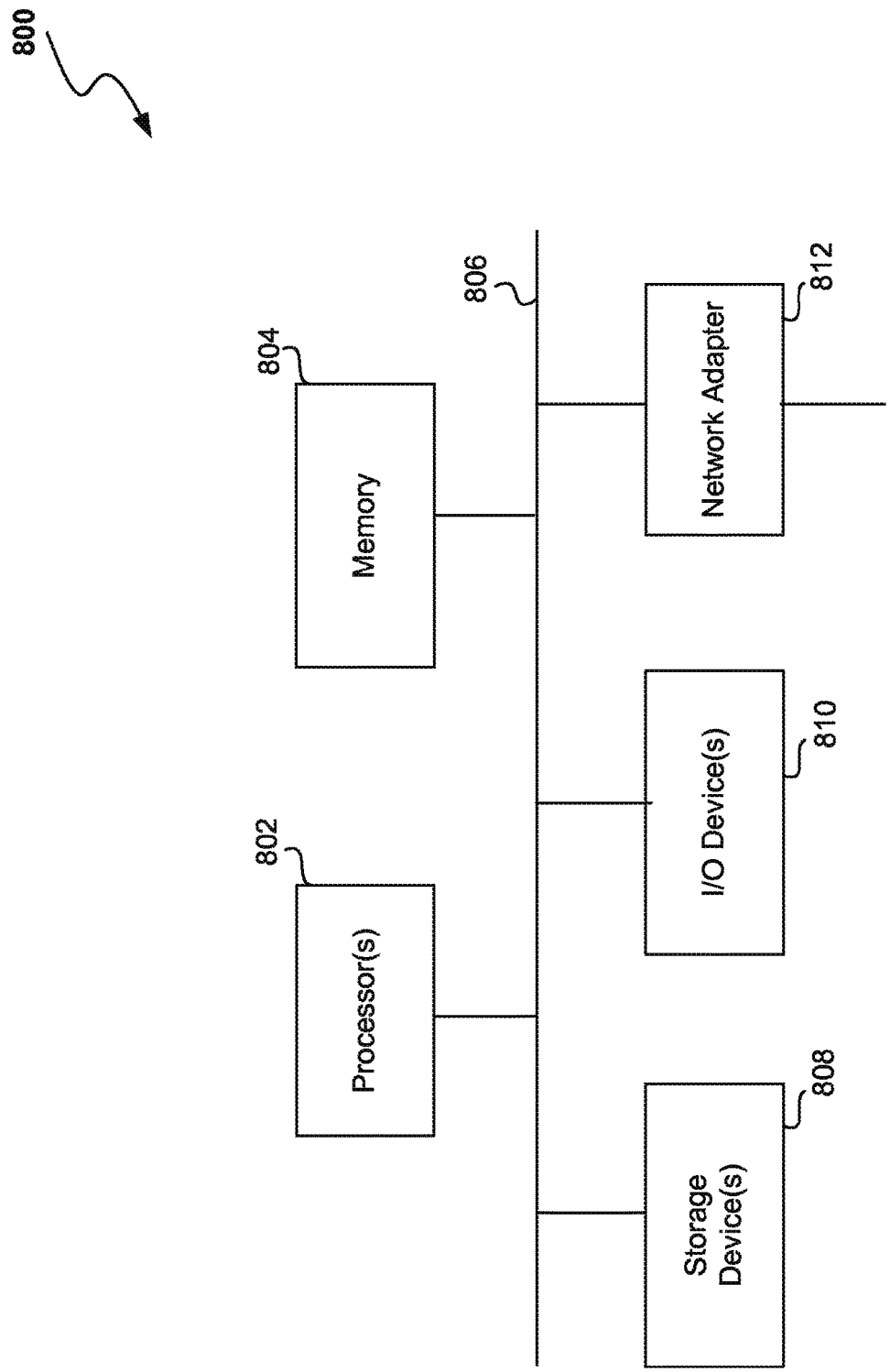
FIG. 8 is a high-level block diagram illustrating an example of a processing system that can be used to implement at least some operations related to the CTM technology.

FIG. 8 is a block diagram of a processing system 800 as may be used to implement features of some embodiments of the CTM technology. In some embodiments, the processing system 800 can be the PSS 300 of FIG. 3, the processing device 400 of FIG. 4, or the CTM 500 of FIG. 5. The processing system 800 can include one or more central processing units ("processors") 802, memory 804, storage devices 808 (e.g., disk drives), input/output devices 810 (e.g., keyboard and pointing devices, display devices), and network adapters 812 (e.g., network interfaces), all of which are connected to an interconnect 806. The interconnect 806 is illustrated as an abstraction that represents any one or more separate physical buses, point to point connections, or both connected by appropriate bridges, adapters, or controllers. The interconnect 806 therefore, may include, for example, a system bus, a Peripheral Component Interconnect (PCI) bus or PCI-Express bus, a HyperTransport or industry standard architecture (ISA) bus, a small computer system interface (SCSI) bus, or a universal serial bus (USB).

The memory 804 and storage devices 808 are computer-readable storage media that may store instructions that implement at least portions of the various embodiments. In addition, the data structures and message structures may be stored in the storage devices 808 or the memory 804, or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 804 can be implemented as software and/or firmware to program the processor(s) 802 to carry out actions described above. In some embodiments, such software or firmware may be initially provided to the processing system 800 by downloading it from a remote system through the processing system 800 (e.g., via network adapter 812).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method comprising:
   receiving, by a payment service system of a payment service and through a mobile payment application executing on a mobile device of a user, a cash withdrawal message,
      wherein the cash withdrawal message includes at least location information and a withdrawal amount submitted by the user to the mobile payment application in a request for cash withdrawal, and
      wherein the mobile payment application is associated with the payment service system;
   identifying, by the payment service system, a list of point-of-sale (POS) systems associated with merchants and physically located within a specified vicinity of a location based at least in part on available cash balances of the POS systems and the location information included in the cash withdrawal message, wherein the merchants are associated with the payment service;
   causing, by the payment service system, the mobile payment application to display the list of POS systems identified based at least in part on available cash balances of the POS systems and the location information included in the withdrawal message for the user to select a POS system from the list of POS systems;
   in response to determining that the mobile device is within a specified distance of a selected POS system, provisioning, by the payment service system, a temporary transaction code to the mobile payment application, wherein the temporary transaction code is configured to cause the withdrawal amount to be dispensed from the merchant to the user via the selected POS system, and wherein the payment service system is configured to deprovision the temporary transaction code for the cash withdrawal at the selected POS system at an end of a specified time period that is dynamically set based on a distance between the mobile device of the user and the selected POS system; and
   based on receiving, by the payment service system and from the selected POS system, a notification that the withdrawal amount has been dispensed from the merchant to the user via the selected POS system based at least in part on a submission of the temporary transaction code to the selected POS system, adjusting a balance associated with a financial account of the user with the payment service based on the withdrawal amount.

2. The computer-implemented method of claim 1, further comprising:
   identifying, by the payment service system, the financial account of the user with the payment service based on the user identification information included in the cash withdrawal message, the user identification information including authentication information associated with a user account of the user that is registered with the payment service, the user account linked to the financial account of the user;
   causing a funds amount representative of the withdrawal amount dispensed from the merchant to the user via the selected POS system to be withdrawn from the financial account of the user with the payment service, and further to be deposited into a financial account associated with the payment service; and
   causing, by the payment service system, a reimbursement funds amount representative of the withdrawal amount dispensed from the merchant to the user via the selected POS system to be withdrawn from the financial account associated with the payment service, and further to be deposited into a financial account associated with the merchant.

3. The computer-implemented method of claim 1, wherein the cash withdrawal message further includes user identification information that includes biometric information associated with the user, wherein the computer-implemented method further comprises:
   transmitting, by the payment service system and to the selected POS system, the biometric information; and
   receiving, by the payment service system and from the selected POS system, a notification that the selected POS system has received a biometric identifier from the user, the biometric identifier including any of a facial recognition or a fingerprint and verified that the biometric identifier correlates with the biometric information transmitted by the payment service system.

4. The computer-implemented method of claim 1, wherein the cash withdrawal message further includes a designated cash withdrawal time, and wherein the temporary transaction code is further provisioned based on the designated cash withdrawal time.

5. A computer-implemented method for cash withdrawal by use of a mobile payment application associated with a payment service and installed on a mobile device of a user, comprising:
- receiving, by a computer system through the mobile payment application installed on the mobile device of the user, a request to withdraw cash;
- identifying, by the computer system, a point-of-sale (POS) system associated with a merchant and physically located within a specified vicinity of the mobile device of the user and based at least in part on an available cash balance of the POS system;
- in response to determining that the mobile device is within a specified distance of the POS system, provisioning, by the computer system, a temporary transaction code to the mobile payment application, wherein the temporary transaction code is configured to cause a withdrawal amount to be dispensed from the merchant to the user via the POS system, and wherein the computer system is configured to deprovision the temporary transaction code for the cash withdrawal at the POS system at an end of a specified time period that is dynamically set based on a distance between the mobile device of the user and the POS system; and
- after sending the temporary transaction code to the mobile device for display and receiving a notification that the withdrawal amount has been dispensed from the merchant to the user via the POS system, adjusting, by the computer system, a balance associated with a financial account of the user with the payment service based on the withdrawal amount.

6. The computer-implemented method of claim 5, further comprising:
- causing, by the computer system, the mobile payment application to display a list of POS systems for the user to select a particular POS system, wherein the POS system is selected from the list of POS systems.

7. The computer-implemented method of claim 5, wherein the specified vicinity of the mobile device to the POS system is based at least in part on geographical information derived from a sensor in the mobile device, wherein the sensor is a BLE sensor or a GPS sensor.

8. The computer-implemented method of claim 5, further comprising:
- receiving, by the computer system and through the mobile payment application, biometric information from the user; and
- transmitting, by the computer system, the biometric information to the POS system, wherein the temporary transaction code is further configured to cause the withdrawal amount to be dispensed from the merchant to the user via the POS system only in an event that the biometric information correlates with a biometric identifier obtained from the user at the POS system.

9. The computer-implemented method of claim 8, wherein the biometric information includes any of a photograph of the user, voice recording of the user, a fingerprint of the user, or a retina scan of the user.

10. The computer-implemented method of claim 8, wherein the biometric identifier includes any of a face, a voice, a fingerprint, or an eye.

11. The computer-implemented method of claim 5, further comprising:
- initiating, by the computer system, a funds transfer representative of the withdrawal amount dispensed from the merchant to the user via the POS system to a financial account associated with the merchant.

12. The computer-implemented method of claim 11, wherein initiating the funds transfer comprises:
- identifying, by the computer system, the financial account of the user with the payment service based on the request received through the mobile payment application;
- causing, by the computer system, the deducted funds to be deposited into a financial account associated with the computer system; and
- causing, by the computer system, a reimbursement funds amount representative of the withdrawal amount dispensed from the merchant to the user via the POS system to be transferred from the financial account associated with the computer system to the financial account associated with the merchant.

13. The computer-implemented method of claim 5, wherein information associated with the POS system includes a device identifier, an internet protocol address, an application identifier, or device characteristics.

14. The computer-implemented method of claim 5, wherein the temporary transaction code is further provisioned based on a code generation scheme configured in coordination with the POS system.

15. The computer-implemented method of claim 14, wherein the code generation scheme comprises an encryption protocol.

16. The computer-implemented method of claim 5, further comprising:
- sending, by the computer system, the temporary transaction code to the POS system for display.

17. A system comprising:
- a network adapter through which to communicate with remote machines;
- a processor coupled to the network adapter;
- a request handler coupled to the processor to receive a cash withdrawal request from a mobile device of a user;
- an account manager coupled to the processor to identify a financial account of the user with a payment service; and
- a transaction machine manager coupled to the processor to:
  - identify a cash transaction machine associated with an entity and physically located within a specified vicinity of the mobile device of the user and based at least in part on an available cash balance of the cash transaction machine;
  - in response to determining that the mobile device is within a specified distance of the cash transaction machine, provision, a temporary transaction code to the mobile device, wherein the temporary transaction code is configured to cause a withdrawal amount to be dispensed from the entity to the user via the cash transaction machine, and wherein the system is configured to deprovision the temporary transaction code for cash withdrawal at the cash transaction machine at an end of a specified time period that is dynamically set based on a distance between the mobile device of the user and the cash transaction machine; and after sending the temporary transaction code to the mobile device for display and receiving a notification that the withdrawal amount has been dispensed from the entity to the user via the cash transaction machine, adjust a balance associated with the financial account of the user with the payment service based on the withdrawal amount.

18. The system of claim 17, wherein the account manager is further configured to identify a financial account associated with the entity; and wherein the transaction machine manager is further configured to initiate a funds transfer representative of the withdrawal amount dispensed from the entity to the user via the cash transaction machine to the financial account associated with the entity.

19. The system of claim 17, wherein the transaction machine manager is further configured to cause the mobile device of the user to display a list of cash transaction machines for the user to select a particular cash transaction machine, wherein the cash transaction machine is selected from the list of cash transaction machines.

20. The system of claim 17 wherein the cash transaction machine is a point-of-sale system associated with a merchant, wherein the entity is the merchant.

* * * * *